(12) United States Patent
Nishikawa

(10) Patent No.: US 12,545,556 B2
(45) Date of Patent: Feb. 10, 2026

(54) TRANSPORT SYSTEM AND METHOD FOR CONTROLLING TRANSPORT SYSTEM

(71) Applicant: KITO CORPORATION, Yamanashi (JP)

(72) Inventor: Kazuhiro Nishikawa, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 242 days.

(21) Appl. No.: 18/574,324

(22) PCT Filed: Jun. 27, 2022

(86) PCT No.: PCT/JP2022/025611
§ 371 (c)(1),
(2) Date: Dec. 27, 2023

(87) PCT Pub. No.: WO2023/276970
PCT Pub. Date: Jan. 5, 2023

(65) Prior Publication Data
US 2024/0286873 A1 Aug. 29, 2024

(30) Foreign Application Priority Data
Jun. 30, 2021 (JP) ................. 2021-109683

(51) Int. Cl.
*B66C 13/08* (2006.01)
*B25J 9/00* (2006.01)
*B66C 17/26* (2006.01)

(52) U.S. Cl.
CPC ............. *B66C 13/08* (2013.01); *B25J 9/0093* (2013.01); *B66C 17/26* (2013.01)

(58) Field of Classification Search
CPC ........ B66C 13/08; B66C 17/26; B25J 9/0093; B25J 19/0008; B66D 1/46; B66D 3/20
See application file for complete search history.

(56) References Cited

U.S. PATENT DOCUMENTS 4,718,667 A * 1/1988 Shoemaker, Jr. ......... A63F 9/30
                                                    212/320
5,350,075 A * 9/1994 Kahlman ............... B66C 23/005
                                                    212/315

(Continued)

FOREIGN PATENT DOCUMENTS

CN      203173512 U  *  9/2013
CN      103818728 A  *  5/2014  ............ B25J 9/1687

(Continued)

OTHER PUBLICATIONS

"Design of a Fuzzy Control Crane type robot arm for EOD application;" Fernando et al., 2021 IEEE 13th International Conference on Humanoid, Nanotechnology, Information Technology, Communication and Control, Environment, and Management (HNICEM) ( 2021, pp. 1-5); 2021-11-28. (Year: 2021).*

(Continued)

*Primary Examiner* — Khoi H Tran
*Assistant Examiner* — Jorge O Peche
(74) *Attorney, Agent, or Firm* — XSENSUS LLP

(57) ABSTRACT

In a transport system, when transporting a suspension means other than at the time of dynamic lift-off when a package is lifted or other than at the time of landing when the package is placed, a third control means executes holding control to perform holding by a holding means, a first control means executes torque control to lower the suspension means when the load increases and to hoist the suspension means when the load decreases, at the time of dynamic lift-off when the package is lifted from the placement surface, or at the time of landing when the package is placed on the placement surface, the third control means executes release control to release the holding by the holding means, and the first control means executes the height control in which the (Continued)

hoisting machine is actuated to control moving the holding means to the target height.

11 Claims, 15 Drawing Sheets

(56) References Cited

U.S. PATENT DOCUMENTS

| | | | | |
|---|---|---|---|---|
| 5,727,702 | A * | 3/1998 | Kullmann | B66C 13/06 |
| | | | | 212/319 |
| 5,850,928 | A * | 12/1998 | Kahlman | B66C 13/22 |
| | | | | 212/289 |
| 5,865,426 | A * | 2/1999 | Kazerooni | B66C 1/62 |
| | | | | 254/270 |
| 5,967,582 | A * | 10/1999 | Saito | B66C 1/442 |
| | | | | 294/902 |
| 6,073,496 | A * | 6/2000 | Kuhn | G01G 19/14 |
| | | | | 73/862.56 |
| 6,554,252 | B2 * | 4/2003 | Kazerooni | B66D 3/18 |
| | | | | 212/331 |
| 7,028,856 | B2 * | 4/2006 | Laundry | B66D 3/18 |
| | | | | 212/270 |
| 7,222,839 | B2 * | 5/2007 | Taylor | B66D 1/485 |
| | | | | 254/270 |
| 7,317,782 | B2 * | 1/2008 | Bjorkholm | G01N 23/04 |
| | | | | 378/57 |
| 7,559,533 | B2 * | 7/2009 | Stockmaster | B66D 3/18 |
| | | | | 254/270 |
| 8,571,712 | B2 * | 10/2013 | Miyauchi | B25J 9/0093 |
| | | | | 414/731 |
| 11,377,330 | B2 * | 7/2022 | Jackson | B66D 1/28 |
| 2007/0080549 | A1 * | 4/2007 | Jenney | B66C 1/10 |
| | | | | 294/81.3 |
| 2008/0027611 | A1 * | 1/2008 | Recktenwald | B66C 13/063 |
| | | | | 701/50 |
| 2009/0283490 | A1 * | 11/2009 | Givens | B25J 9/1065 |
| | | | | 212/317 |
| 2010/0106287 | A1 * | 4/2010 | Iizuka | B66F 9/07 |
| | | | | 700/218 |
| 2012/0325021 | A1 * | 12/2012 | Nishikawa | G01G 9/00 |
| | | | | 73/862.193 |
| 2013/0085601 | A1 * | 4/2013 | Sueyoshi | B25J 5/02 |
| | | | | 700/245 |
| 2016/0332299 | A1 * | 11/2016 | Suzuki | B25J 9/1697 |
| 2017/0348859 | A1 * | 12/2017 | Takebayashi | B25J 11/00 |
| 2018/0222042 | A1 * | 8/2018 | Prüssmeier | B25J 9/1065 |
| 2019/0292019 | A1 * | 9/2019 | Ripping | B63B 27/32 |
| 2020/0307966 | A1 * | 10/2020 | Beer | B66C 13/56 |
| 2021/0078840 | A1 * | 3/2021 | Andresen | B63B 27/16 |
| 2022/0144610 | A1 * | 5/2022 | Keller | B66F 9/10 |
| 2022/0396457 | A1 * | 12/2022 | Nishikawa | B66D 1/485 |
| 2023/0213372 | A1 * | 7/2023 | Okamoto | G01G 19/18 |
| | | | | 177/211 |
| 2023/0356411 | A1 * | 11/2023 | Ouchi | B25J 9/1682 |
| 2024/0286873 | A1 * | 8/2024 | Nishikawa | B66D 1/46 |
| 2025/0074751 | A1 * | 3/2025 | Nishikawa | B66D 3/26 |

FOREIGN PATENT DOCUMENTS

| | | | | |
|---|---|---|---|---|
| CN | 107416699 | A * | 12/2017 | B66C 13/08 |
| CN | 117864958 | A * | 4/2024 | B66C 1/12 |
| DE | 102015005908 | B4 * | 3/2019 | B25J 13/085 |
| EP | 2898998 | B1 * | 2/2020 | B25J 9/1682 |
| ES | 2531374 | T3 * | 3/2015 | B66C 13/085 |
| GB | 2476739 | A * | 7/2011 | B66C 13/06 |
| JP | H10330070 | A * | 12/1998 | |
| JP | 2004292076 | A * | 10/2004 | |
| JP | 2011162357 | A * | 8/2011 | B66C 13/40 |
| JP | 2011251852 | A * | 12/2011 | B66C 13/40 |
| JP | 2014128860 | A * | 7/2014 | |
| JP | 6071549 | B2 | 2/2017 | |
| JP | 2019-072804 | A | 5/2019 | |
| JP | 7059605 | B2 * | 4/2022 | B66C 13/063 |
| KR | 101608693 | B1 * | 4/2016 | G05B 15/02 |
| WO | WO-2016103299 | A1 * | 6/2016 | B66C 11/12 |
| WO | 2021/079642 | A1 | 4/2021 | |
| WO | WO-2022209012 | A1 * | 10/2022 | B66C 13/105 |
| WO | WO-2023276970 | A1 * | 1/2023 | B66C 17/26 |
| WO | WO-2025110246 | A1 * | 5/2025 | B25J 19/00 |

OTHER PUBLICATIONS

"Design and Research for Industrial Robot Using Goods Sorting in Warehouse;" Liu et al., 2022 WRC Symposium on Advanced Robotics and Automation (WRC SARA) (2022, pp. 53-57); Aug. 20, 2022. (Year: 2022).*

"Motion control of hydraulic telescopic boom crane;" Xue et al., 2023 IEEE 7th Information Technology and Mechatronics Engineering Conference (ITOEC) (vol. 7, 2023, pp. 2430-2434); Sep. 15, 2023. (Year: 2023).*

International Search Report and Written Opinion mailed on Aug. 30, 2022, received for PCT Application PCT/JP2022/025611, filed on Jun. 27, 2022, 8 pages including English Translation.

Notice of Allowance issued on Jun. 11, 2024, in corresponding Japanese patent Application No. 2023-531952, 5 pages.

* cited by examiner

| | OPERATION | HOISTING MACHINE | | CHUCKING DEVICE | ROBOT HAND | ROBOT DEVICE |
|---|---|---|---|---|---|---|
| STEP S1 | PREPARATION FOR INSERTION OF CHUCKING DEVICE | TORQUE CONTROL (BALANCER CONTROL) | | NON-HOLDING OF PACKAGE | GRIP | POSITION CONTROL |
| STEP S2 | LOWERING TO CHUCKING HEIGHT | HEIGHT CONTROL | LOWERING | | RELEASE | STOP |
| STEP S3 | STOP AT CHUCKING HEIGHT | HEIGHT CONTROL | STOP | | RELEASE | STOP |
| STEP S4 | HOISTING FOR DYNAMIC LIFT-OFF | | HOISTING | HOLDING OF PACKAGE | | |
| STEP S5 | TRANSPORT OF PACKAGE | TORQUE CONTROL (BALANCER CONTROL) | | | GRIP | POSITION CONTROL |
| STEP S6 | LOWERING FOR LANDING | HEIGHT CONTROL | LOWERING | | RELEASE | STOP |
| STEP S7 | STOP AT LANDING | HEIGHT CONTROL | STOP | NON-HOLDING OF PACKAGE | RELEASE | STOP |
| STEP S8 | TAKING OUT CHUCKING DEVICE | | HOISTING | | | |
| STEP S9 | MOVING OF CHUCKING DEVICE | TORQUE CONTROL (BALANCER CONTROL) | | | GRIP | POSITION CONTROL |

FIG. 6

TRANSPORT SYSTEM AND METHOD FOR CONTROLLING TRANSPORT SYSTEM

CROSS REFERENCE TO RELATED APPLICATIONS

This is a U.S. national stage of application No. PCT/JP2022/025611, filed on Jun. 27, 2022. Priority under 35 U.S.C. § 119(a) and 35 U.S.C. § 365(b) is claimed from Japanese Patent Applications No. 2021-109683, filed on Jun. 30, 2021, the disclosure of which is also incorporated herein by reference.

TECHNICAL FIELD

The present invention relates to a transport system and a method for controlling the transport system.

BACKGROUND ART

An example of a transport system using a suspension device to lift and lower a package and a robot device includes, for example, the one disclosed in Patent Literature 1. Patent Literature 1 discloses a transport system (1) in which a suspension device (3) and a robot (4) cooperate to transport a workpiece (2). In Patent Literature 1, the suspension device (3) includes a supporting mechanism (10), a lift unit (15), and a suspension jig (16). In such a transport system, a large load is borne by the suspension device to reduce the load loaded on the robot device.

Incidentally, in the above transport system, when operation in the vertical direction is not synchronized between the lift unit (15) and robot arms (21 to 25), motors (31 to 35) on the robot (4) side or a servomotor (15a) of the lift unit (15) may be overloaded and these motors (devices) may be damaged. Therefore, in a configuration disclosed in Patent Literature 1, a roller ball (28) is provided in a hand (26) included by the robot (4) to allow relative movement of a holding part (18c) in a vertical direction.

That is, in the configuration disclosed in Patent Literature 1, the lifting and lowering operations of the hand (26) and the lift unit (16) in the vertical direction are basically synchronized. However, when the timing of the lifting/lowering operation deviates between the operation of the hand (26) in the vertical direction and the operation of the lift unit (16) (attachment mechanism (18)) in the vertical direction, the roller ball (28) rolls against the holding part (18c), thereby absorbing the deviation.

CITATION LIST

Patent Literature

{PTL 1} JP 6071549B2

SUMMARY OF INVENTION

Technical Problem

Incidentally, the transport system disclosed in Patent Literature 1 uses a configuration in which the roller ball (28) is provided in the hand (26) in addition to the suspension jig (16) for suspending a workpiece. Therefore, the configuration becomes more complex, and a manufacturing cost increases to the extent that the roller ball (28) is provided in the hand (26).

In the transport system disclosed in Patent Literature 1, the hand (26) is equipped with the roller ball (28), which makes it difficult for the robot (4) side to bear the load in the vertical direction, and the workpiece (2) is not held well. On the other hand, since the robot arm performs a curvilinear motion via joints, it is normal for the hand (26) to fluctuate in position in the vertical direction. Moreover, a wire (17) can swing (rotate) with a winding drum (15c) side as a fulcrum also on the supporting mechanism (10) side. Therefore, when moving the hand (26), it is necessary to follow the swing (rotation) of the holding part (18c) suspended from the wire (17), which places large restriction on the hand (26) movement on the robot (4) side.

When the hand (26) moves up and down rapidly, the holding state of the holding part (18c) may be released. Therefore, operability in transporting the workpiece (2) is not good.

The present invention was made in view of the above circumstances, and it is an object to provide a transport system and a method for controlling the transport system that are simple in configuration, are in a state with few restrictions on movement on the robot device side, and can provide good operability when transporting a package.

Solution to Problem

To solve the above problems, according to a first aspect of the present invention, there is provided a transport system transporting a package to a desired position, including: a hoisting machine that can lift and lower the package and includes a load detection means for detecting the acting load or a change in the load; a crane to which the hoisting machine is attached and that can move the hoisting machine in a horizontal direction by applying external force to the hoisting machine; a suspension means that hangs from the hoisting machine and can hold the package; a robot device that includes a holding means capable of holding the package or the suspension means and a robot arm that moves the holding means to a desired position; a first control means that can perform torque control of the hoisting machine to generate torque in accordance with the load acting on the hoisting machine and height control of the hoisting machine to move the suspension means to a predetermined target height; a second control means that controls actuation of the robot arm; a third control means that controls actuation of the holding means; and a main control means that gives predetermined control commands to the first control means, second control means, and third control means, wherein when transporting the suspension means other than at the time of dynamic lift-off when the package is lifted from a placement surface or other than at the time of landing when the package is placed on the placement surface, the third control means executes holding control to perform holding by the holding means according to the control command from the main control means, the first control means executes the torque control to lower the suspension means when the load increases and to hoist the suspension means when the load decreases based on a detection result by the load detection means according to the control command from the main control means, at the time of dynamic lift-off when the package is lifted from the placement surface, or at the time of landing when the package is placed on the placement surface, the third control means executes release control to release the holding by the holding means according to the control command from the main control means, and the first control means executes the height control in which the hoisting machine is actuated to control moving the holding means to the target height according to the control command from the main control means.

In the above invention, in the torque control, the second control means preferably executes position control to move the holding means to a predetermined target position by actuation of the robot arm including vertical direction.

In the above invention, in the torque control, the second control means preferably executes position control to move the holding means to a predetermined target position by actuation of the robot arm including vertical direction.

In the above invention, in the height control, the second control means preferably controls the robot arm to stop its actuation.

In the above invention, the suspension means is a chucking device capable of holding the package, and the chucking device preferably continues to hold the package in both the height control and torque control between a stop state of the hoisting machine before the dynamic lift-off of the package and the stop state of the hoisting machine after the package is landed.

Further, to solve the above problems, according to a second aspect of the present invention, there is provided a method for controlling a transport system transporting a package to a desired position, wherein the transport system includes: a hoisting machine that can lift and lower the package and includes a load detection means for detecting the acting load or a change in the load; a crane to which the hoisting machine is attached and that can move the hoisting machine in a horizontal direction by applying external force to the hoisting machine; a suspension means that hangs from the hoisting machine and can hold the package; a robot device that includes a holding means capable of holding the package or the suspension means and a robot arm that moves the holding means to a desired position; a first control means that can perform torque control of the hoisting machine to generate torque in accordance with the load acting on the hoisting machine and height control of the hoisting machine to move the suspension means to a predetermined target height; a second control means that controls actuation of the robot arm; a third control means that controls actuation of the holding means; and a main control means that gives predetermined control commands to the first control means, second control means, and third control means, the control method including: a holding control step in which the third control means executes holding control to perform the holding by the holding means according to the control command from the main control means when transporting the suspension means other than at the time of dynamic lift-off when the package is lifted from a placement surface or other than at the time of landing when the package is placed on the placement surface; a torque control step in which the first control means executes torque control to lower the suspension means when the load increases and hoist when the load decreases based on a detection result of load detection in the holding control step according to the control command from the main control means; a release control step in which the third control means executes release control to release the holding by the holding means according to the control command from the main control means at the time of dynamic lift-off when the package is lifted from the placement surface or at the time of landing when the package is placed on the placement surface, and a height control step in which the first control means executes the height control to actuate the hoisting machine to control the moving of the holding means to the target height in the vertical direction according to the control command from the main control means in the release control step.

Advantageous Effects of Invention

According to the present invention, it is possible to provide a transport system and a method for controlling the transport system that are simple in configuration, have fewer restrictions on movement on a robot device side, and also provide good operability when transporting a package.

BRIEF DESCRIPTION OF DRAWINGS

FIG. 6 is a view illustrating operations performed by each portion (device) in steps S1 to S9 of the operation in the transport system illustrated in FIG. 1 in tabular form.

DESCRIPTION OF EMBODIMENTS

Hereinafter, a transport system 10 and a method for controlling the transport system 10 according to one embodiment of the present invention will be explained based on the drawings.

1. Regarding Configuration of Transport System 10

Figure 1:
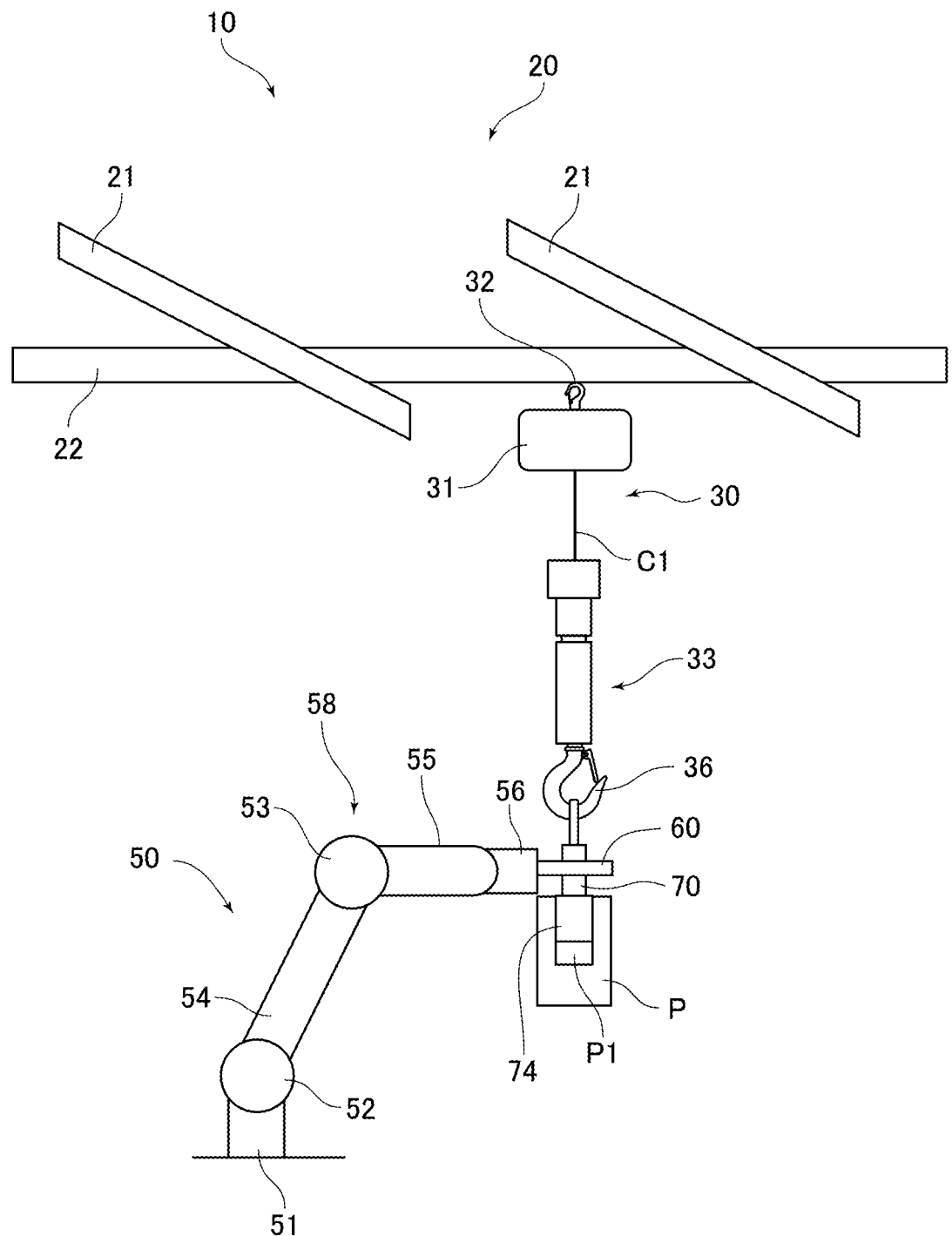
FIG. 1 is a schematic view illustrating an overall configuration of a transport system according to a first embodiment of the present invention.

FIG. 1 is a schematic view illustrating an overall configuration of a transport system 10. As illustrated in FIG. 1, main components of the transport system 10 are a hand crane 20, a hoisting machine 30, a robot device 50, and a chucking device 70.

The hand crane 20 includes traveling rails 21 and a traversing rail 22. The traveling rail 21 is a long member that is suspended from a fixed position, such as a ceiling and is fixed to the above fixed position so that it does not move with an operator's manual pulling motion. The hand crane 20 corresponds to a crane. The traversing rail 22 has a not-illustrated pulley, which enables the hand crane 20 to move along the traveling rail 21 via the pulley.

Figure 2:
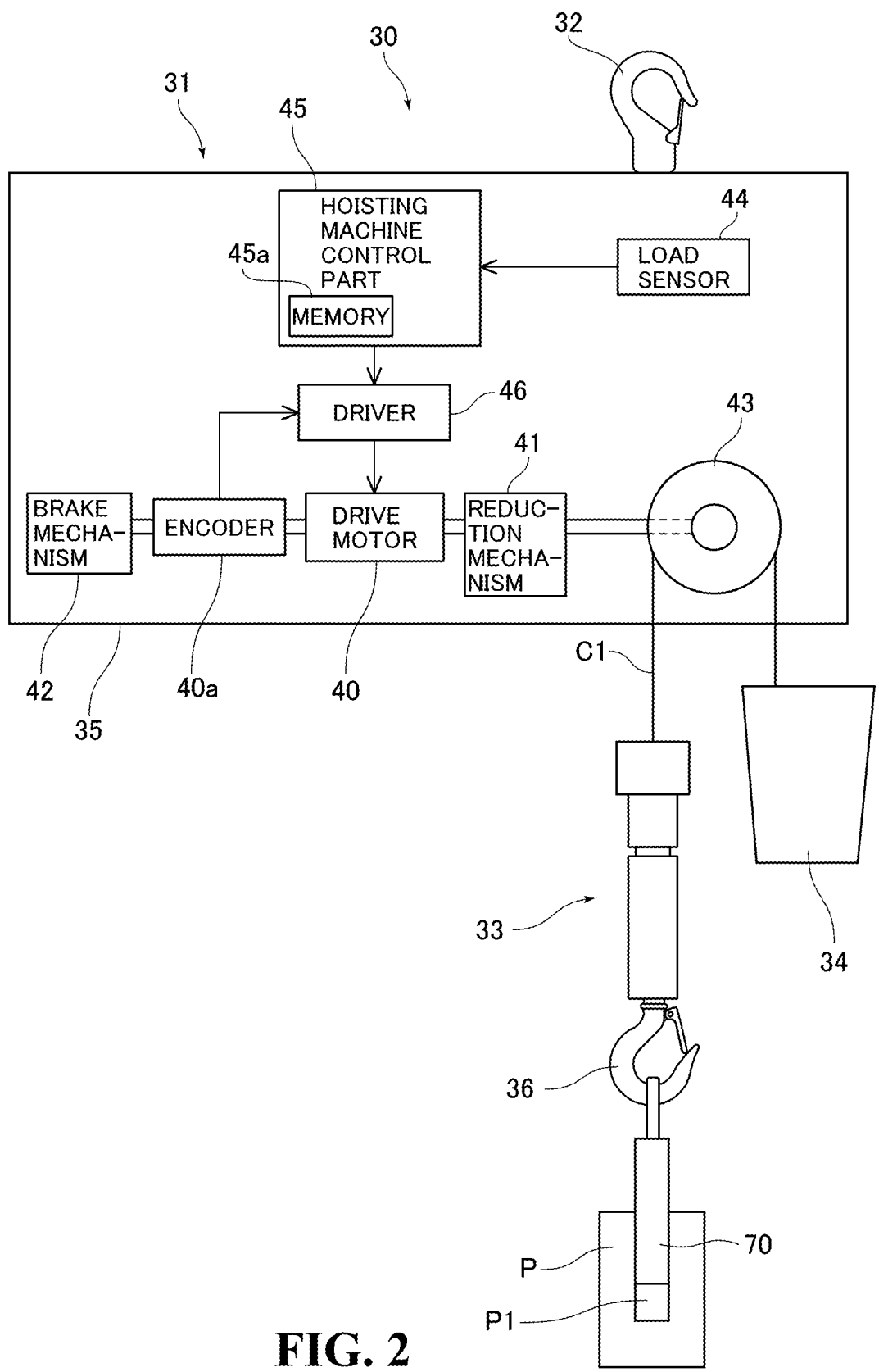
FIG. 2 is a view illustrating a control configuration of a hoisting machine illustrated in FIG. 1.

FIG. 2 is a view illustrating a control configuration of the hoisting machine 30. As illustrated in FIG. 2, main components of the hoisting machine 30 are a hoisting machine body part 31, an upper hook 32, a cylinder operating device 33, a chain bucket 34 that holds a wound load chain C1, and a lower hook 36.

The hoisting machine body part 31 is suspended from the traversing rail 22 described above via the upper hook 32 and not-illustrated pulley. Therefore, the operator can move the hoisting machine body part 31 (hoisting machine 30) along the traversing rail 22 by pulling the load chain C1 by hand. The hoisting machine body part 31 contains various components inside its housing 35. Concretely, a drive motor 40, a reduction mechanism 41, a brake mechanism 42, a load sheave 43 that hoists the load chain C1, a load sensor 44, a hoisting machine control part 45, and a driver 46 are provided inside the housing 35.

Instead of the load chain C1 and load sheave 43, the hoisting machine main body can be made up of a not-illustrated rope and winding drum. In this case, the wound rope is held by the winding drum, so the chain bucket 34 is not necessary.

The drive motor 40 is a motor that provides driving force to drive the load sheave 43. In this embodiment, the drive motor 40 is a servo motor including a detector (encoder 40a) for detecting a position (rotational position of a not-illustrated rotor), which is preferred to be an AC servo motor. Incidentally, as the AC servo motor, a synchronous motor is preferred, but an induction-type motor is also acceptable.

The reduction mechanism 41 is a part that reduces the rotation of the drive motor 40 and transmits it to the load sheave 43 side. The brake mechanism 42 is a part that can release brake force by electromagnetic force when the drive motor 40 is actuated but also generates the brake force to hold a package P even when the drive motor 40 is not actuated.

The load sheave 43 is a part that hoists and lowers the load chain C1 and includes a plurality of chain pockets into which metal rings of the load chain C1 enter provided along its outer periphery.

The load sensor 44 is a load sensor that measures a loading load applied to the upper hook 32. That is, the load sensor 44 is a sensor that measures and detects a total loading load of a loading load of the hoisting machine body part 31, a loading load of the load chain C1 (the part that has not landed on a floor or the like), and a loading load of the package P. By subtracting the main body's own weight and so on from the total loading load measured and detected using this load sensor 44, the loading load applied to the load sheave 43 via the load chain C1 can be detected (calculated). The load sensor 44 is attached, for example, to an attachment shaft for attaching the upper hook 32 to the hoisting machine body part 31. The load sensor 44 corresponds to a load detection means.

A load cell including a strain gauge can be used as the load sensor 44. A position where the load sensor 44 is arranged may be any position as long as it is a position where the load applied to the load sheave 43 by the load chain C1 suspending the package P can be detected and measured, such as a position between the upper hook 32 and the not-illustrated pulley, between the lower hook 36 and the package P, or between a terminal of the load chain C1 and the lower hook 36 in addition to the above position. Further, a crane scale or the like can be used as the load sensor 44 in addition to the load cell, but it is required to have accuracy and responsiveness that can be used for balancer control.

The hoisting machine control part 45 is a part that can control the driver 46 according to a control mode (height control mode or torque control mode) based on commands from a main control part 81 described below, and also provides command values such as position (height), speed, and torque in each control mode. This hoisting machine control part 45 and the driver 46 correspond to a first control means. Examples of the hoisting machine control part 45 include a computer or an integrated circuit including a CPU (central processing unit), a memory (RAM (random access memory), ROM (read-only memory), internal storage, external memory device, and so on), an input/output interface, and so on.

The driver 46 is a part that controls a power source supplied from the outside to an appropriate power based on a current value of the drive motor 40, output of the encoder 40a, a command value for controlling motor driving given by the hoisting machine control part 45, or the like, and supplies the power to the drive motor 40 to rotate the drive motor 40.

The cylinder operating device 33 is an operating device for an operator to perform operation while holding it by hand and is connected to a lower end side of the load chain C1. Further, the lower hook 36 for hanging the package P is connected to the cylinder operating device 33. Instead of the cylinder operating device 33, an operating device (pendant switch) suspended by a cable from the hoisting machine body part 31, or the like of the hoisting machine 30, may be used, or a wireless remote control device may be used. When the hoisting machine 30 is actuated independently without the cooperation of the hoisting machine 30 and the robot device 50, the cylinder operating device 33 can be operated by the operation to enable vertical motion by the operator using a not-illustrated grip part of the cylinder operating device 33 as a switch to move it up and down by sliding, or an operation to control a torque of the drive motor 40 (torque control) in response to later-described changes in the load caused by the operator's hand power (external force), and each operation can be switched manually.

The chain bucket 34 is a part that houses the (wound-up) load chain C1 on a no-load side, which is present on the side opposite to the lower hook 36 across the load sheave 43.

Next, the robot device 50 will be described. The robot device 50 includes a leg part 51, a plurality of joint parts 52, 53, a plurality of arms 54, 55, a wrist part 56, and motors 57a to 57f for driving them. The robot device 50 also includes a robot hand 60. The joint parts 52, 53, arms 54, 55, wrist part 56, and motors 57a to 57f constitute a robot arm 58.

Among the above, the leg part 51 is a portion standing upward from an installation surface such as a floor, and rotatably supports the joint part 52. The leg part 51 contains the motor 57a, and by driving the motor 57a, the joint part 52 (a first joint part 52) can rotate around an axis perpendicular to the installation surface (denoted as an S-axis).

The first joint part 52 is provided at an upper end of the leg part 51. The arm 54 (a first arm 54) is rotatably attached to the first joint part 52, and the motor 57b is arranged at the first joint part 52. The motor 57b rotates the first arm 54 around an axis parallel to the installation surface (an axis perpendicular to a paper surface in FIG. 1; denoted as an L axis). Therefore, the first arm 54 has two degrees of freedom of rotation.

Electric or air motors can be used as the motors 57a to 57f, including the motors 57a and 57b.

On a tip side of the first arm 54, the joint part 53 is rotatably attached, and the motor 57c is housed. By driving the motor 57c, the above joint part 53 (a second joint part 53)

can rotate around an axis parallel to the installation surface (an axis perpendicular to the paper surface in FIG. 1 (denoted as a U-axis)). The arm 55 (a second arm 55) is rotatably attached to this second joint part 53, and the motor 57d is arranged at this second joint part 53. The motor 57d rotates the second arm 55 around an axis (denoted as an R axis) that is perpendicular to the axis (the U axis) perpendicular to the paper surface in the above FIG. 1. Therefore, the second arm 55 has two degrees of freedom of rotation.

On a tip side of the second arm 55, the wrist part 56 is rotatably attached, and the motor 57e is housed. By driving the motor 57e, the wrist part 56 can rotate around an axis orthogonal to the R-axis and S-axis described above (denoted as a B-axis). The wrist part 56 houses the motor 57f, through which the robot hand 60 can rotate around an axis perpendicular to the above B-axis (denoted as a T-axis).

Figure 3:
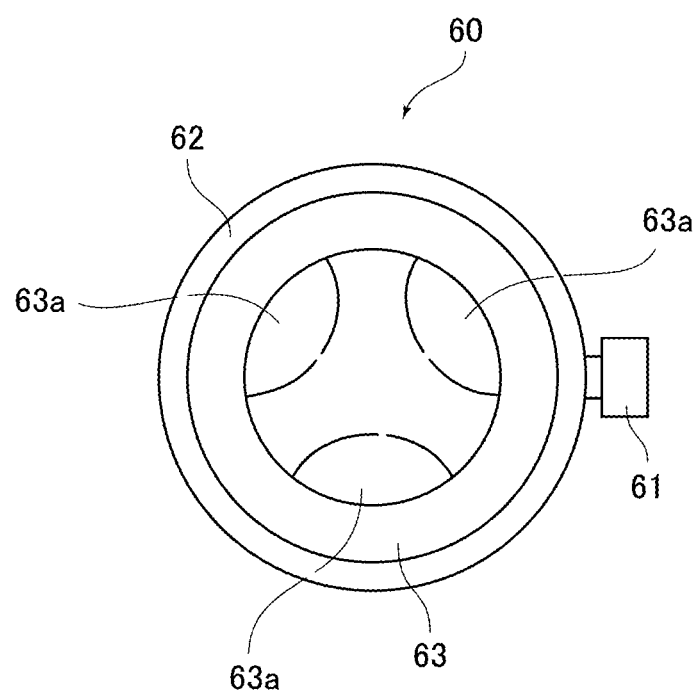
FIG. 3 is a plan view illustrating a configuration of a robot hand attached to a robot device of the transport system illustrated in FIG. 1.

The robot hand 60 is attached to a tip side of the wrist part 56. The robot hand 60 corresponds to a holding means. FIG. 3 is a plan view illustrating a configuration of the robot hand 60. As illustrated in FIG. 3, the robot hand 60 includes an attachment part 61, a cylindrical part 62, a holding tube 63, and an actuator 64 (see FIG. 5). The attachment part 61 is a part attached to the wrist part 56 described above. The attachment part 61 may have a built-in air inlet path (not illustrated) for supplying air to the holding tube 63 or the air inlet path may be provided separately from the attachment part 61.

The cylindrical part 62 is provided with a cylindrical appearance and is made of a material that is stronger than the holding tube 63 and is not easily deformed. The cylindrical part 62 has the holding tube 63 attached to its inner circumference. The holding tube 63 is a member that expands toward an inner diameter side when air is introduced from the air inlet path. The holding tube 63 is formed by an airtight and easily expandable material such as rubber, for example. The holding tube 63 is provided with a plurality of expansion portions 63a (three in total in FIG. 3), and when the expansion portions 63a expand, the chucking device 70 can be held. In FIG. 3, the expansion portions 63a are indicated by double-dotted lines.

For example, a compressor or pump can be used as the actuator 64. The holding tube 63 is connected directly or indirectly to the actuator 64, and air can be fed into the holding tube 63 by pressurization, or the fed air can be depressurized. The actuator 64 can be equipped with a valve or the like for pressure adjustment.

Figure 4:
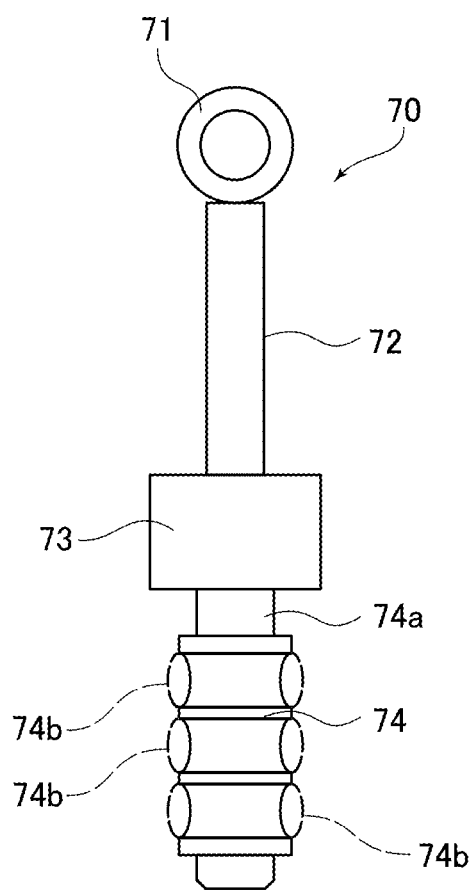
FIG. 4 is a side view illustrating a configuration of a chucking device included by the transport system illustrated in FIG. 1.

Next, the chucking device 70 is described. The chucking device 70 corresponds to a suspension means. FIG. 4 is a side view illustrating a configuration of the chucking device 70. As illustrated in FIG. 1, the chucking device 70 is a member that is suspended from the lower hook 36. As illustrated in FIG. 4, the chucking device 70 includes a hook hooking part 71, a hand holding part 72, an air drive part 73, and an expansion holding part 74. The hook hooking part 71 is a portion hooked on the lower hook 36 by being provided in a ring form.

The hand holding part 72 is a portion that the robot hand 60 grips, and is rod-shaped. Therefore, the robot hand 60 can move along the hand holding part 72 in the vertical direction. A length of the hand holding part 72 is set as follows. That is, the length of the hand holding part 72 is set so that the robot hand 60 can grasp the hand holding part 72 even when the hand holding part 72 moves in the vertical direction when the expansion holding part 74 is inserted into an insertion hole P1 of the package P or when the expansion holding part 74 is pulled out of the insertion hole P1.

The air drive part 73 is a portion that pressurizes the expansion holding part 74 to feed air and release the pressurization. The air drive part 73 is provided with a larger diameter than the expansion holding part 74 to enable positioning when the expansion holding part 74 is inserted into the insertion hole P1 of the package P.

Similar to the robot hand 60 described above, the expansion holding part 74 is a part that expands when air is introduced and is inserted into the insertion hole P1 of the package P. The expansion holding part 74 includes a rod part 74a and an expansion holding part 74b. The rod part 74a is a rod-shaped part protruding downward from the air drive part 73. The rod part 74a is not limited to the rod-shaped part but can be a cylindrical part.

The expansion holding part 74b is a part that expands toward an outer diameter side when air is introduced from the air inlet path connected to the air drive part 73. This expansion holding part 74b is formed by an easily expandable material such as rubber, for example, like the holding tube 63. The expansion holding part 74b has a plurality of expansion portions along its longitudinal direction (three in total in FIG. 4), which enables stable support of the package P.

Figure 5:
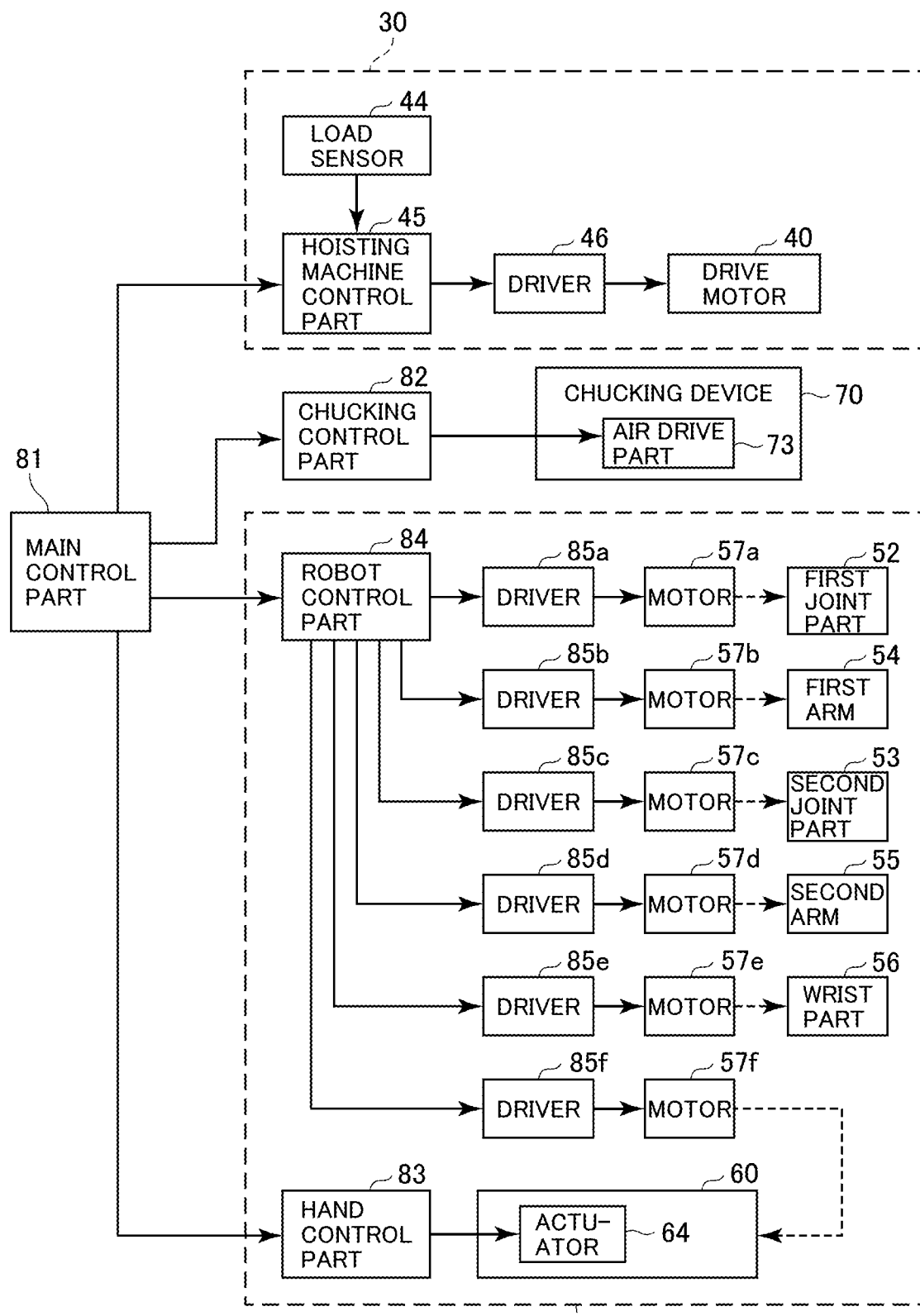
FIG. 5 is a block view illustrating a control configuration of the transport system illustrated in FIG. 1

Next, a control configuration of the transport system 10 is described. FIG. 5 is a block view illustrating the control configuration of the transport system 10. As illustrated in FIG. 5, a control part of the transport system 10 includes the main control part 81, the hoisting machine control part 45, a chucking control part 82, a hand control part 83, and a robot control part 84.

Examples of the main control part 81, chucking control part 82, hand control part 83, and robot control part 84 include, for example, a computer or an integrated circuit including a CPU (central processing unit), memory (RAM (random access memory), ROM (read-only memory), internal storage, external storage devices, or other devices), input/output interfaces, and so on. The main control part 81 corresponds to a main control means. The robot control part 84 and drivers 85a to 85f correspond to a second control means, the hand control part 83 corresponds to a third control means, and the chucking control part 82 corresponds to a fourth control means.

The main control part 81 is a portion that performs overall control of the transport system 10, transmits signals related to control commands to each of the control parts 45, 82, 83, and 84, and receives signals corresponding to completion of predetermined operations from each of the control parts 45, 82, 83, and 84. The chucking control part 82 is a part that controls actuation of the chucking device 70. The hand control part 83 is a part that controls actuation of the robot hand 60. The robot control part 84 is a part that controls actuation of each of the motors 57a to 57f of the robot device 50 via the drivers 85a to 85f.

2. Regarding Operation of Transport System 10

Operation of the above-described transport system 10, when transporting the package P, is explained below based on FIG. 6. FIG. 6 is a view illustrating the operations performed by each portion (device) in steps S1 to S9 in a tabular form.

Step S1: Preparation for Insertion of Chucking Device 70

[Hoisting Machine 30 in Step S1]

Figure 7:
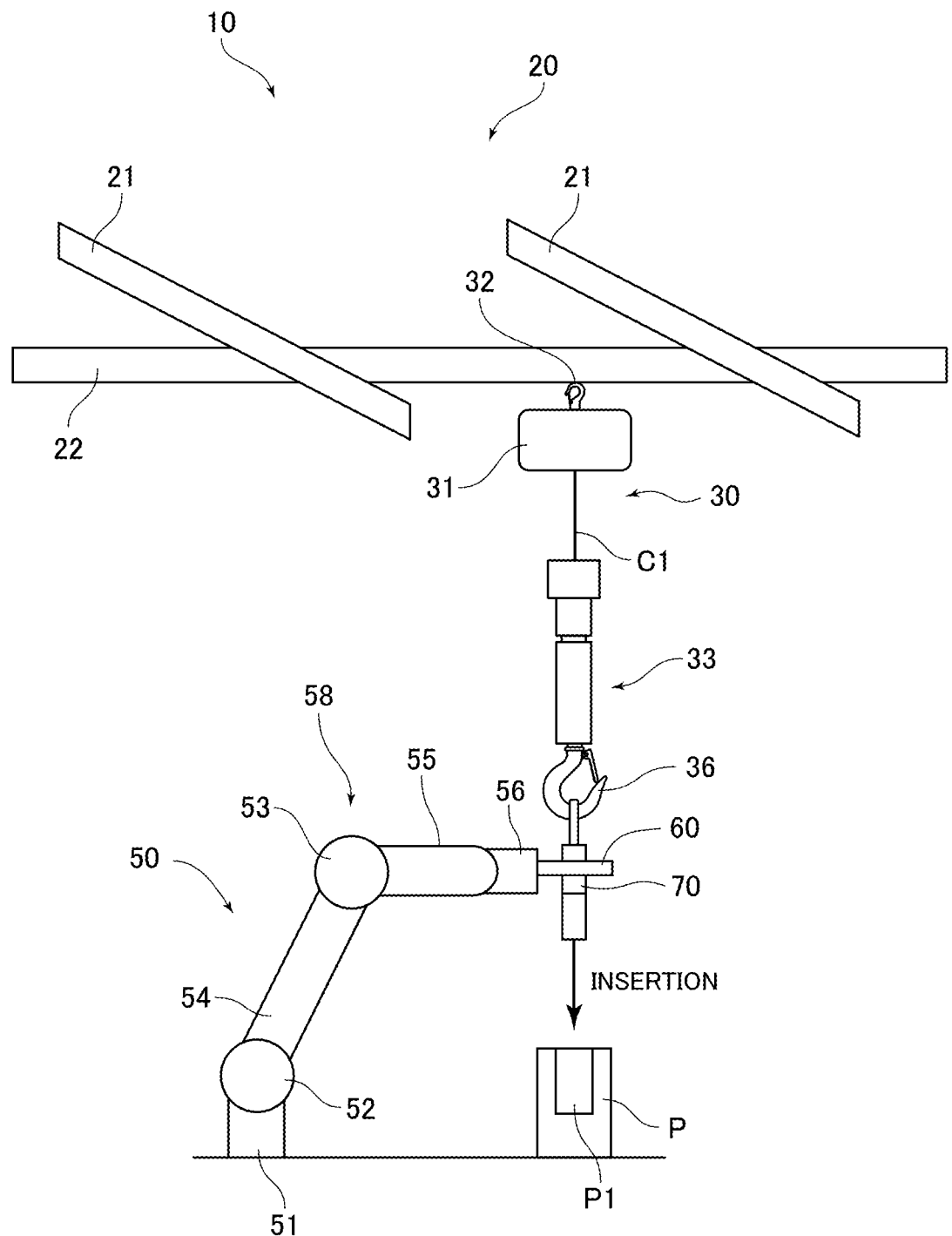
FIG. 7 is a view illustrating a state of each component of the transport system in step S1 illustrated in FIG. 6.

FIG. 7 is a view illustrating a state of each component of the transport system 10 in step S1. As illustrated in FIG. 7, in step S1 before insertion of the chucking device 70, the chucking device 70 is moved toward the insertion hole P1 of the package P. At this time, torque control (balancer control) is performed in the hoisting machine 30. In such control, the hoisting machine control part 45 controls such that a constant torque is exerted on the drive motor 40 (corresponding to part of a torque control step) based on a detection result of the load by the load sensor 44, according to the control command from the main control part 81. In the torque control of the hoisting machine 30, a predetermined load is detected by the load sensor 44 and a value of the load is stored in a memory 45a.

Thus, for example, when the package P is lifted by hand (robot hand 60) while the package P is suspended, the load detected by the load sensor 44 becomes lighter (smaller), and the hoisting machine control part 45 applies driving force toward a hoisting direction to the drive motor 40. Thereby, force in a direction of lifting the package P is exerted, and as a result, the load of the package P acting on the hand becomes very light or almost no load is felt.

Here, in step S1, the load detected by the load sensor 44 is very small compared to the package P being suspended because the package P is not suspended yet. Therefore, the hoisting machine control part 45 controls the drive of the drive motor 40 to perform the torque control (balancer control) to maintain such a small load.

[Chucking Device 70 in Step S1]

In the chucking device 70, the chucking control part 82 controls actuation of the air drive part 73 so that the expansion holding part 74b is not pressurized by the air drive part 73 based on the control command from the main control part 81. Therefore, the expansion holding part 74b of the chucking device 70 is in a non-expanded state, which enables the chucking device 70 to be inserted into the insertion hole P1.

[Robot Hand 60 in Step S1]

In step S1, the hand control part 83 controls actuation of the actuator 64 of the robot hand 60 to hold (grip) the chucking device 70, based on the control command from the main control part 81. Thereby, the robot hand 60 is in a state to hold the hand holding part 72 of the chucking device 70 (corresponding to part of a holding control step).

[Robot Device 50 in Step S1]

In step S1, the robot control part 84 performs position control of the robot hand 60 (chucking device 70) based on the control command from the main control part 81. That is, the robot control part 84 controls actuation of each of the motors 57a to 57f so that the robot hand 60 (chucking device 70) follows a predetermined path to reach a target height and position. In such position control, the actuation of each of the motors 57a to 57f is controlled so that the chucking device 70 is positioned above the insertion hole P1 of the package P.

Step S2: Lowering to Chucking Height

[Hoisting Machine 30 in Step S2]

Figure 8:
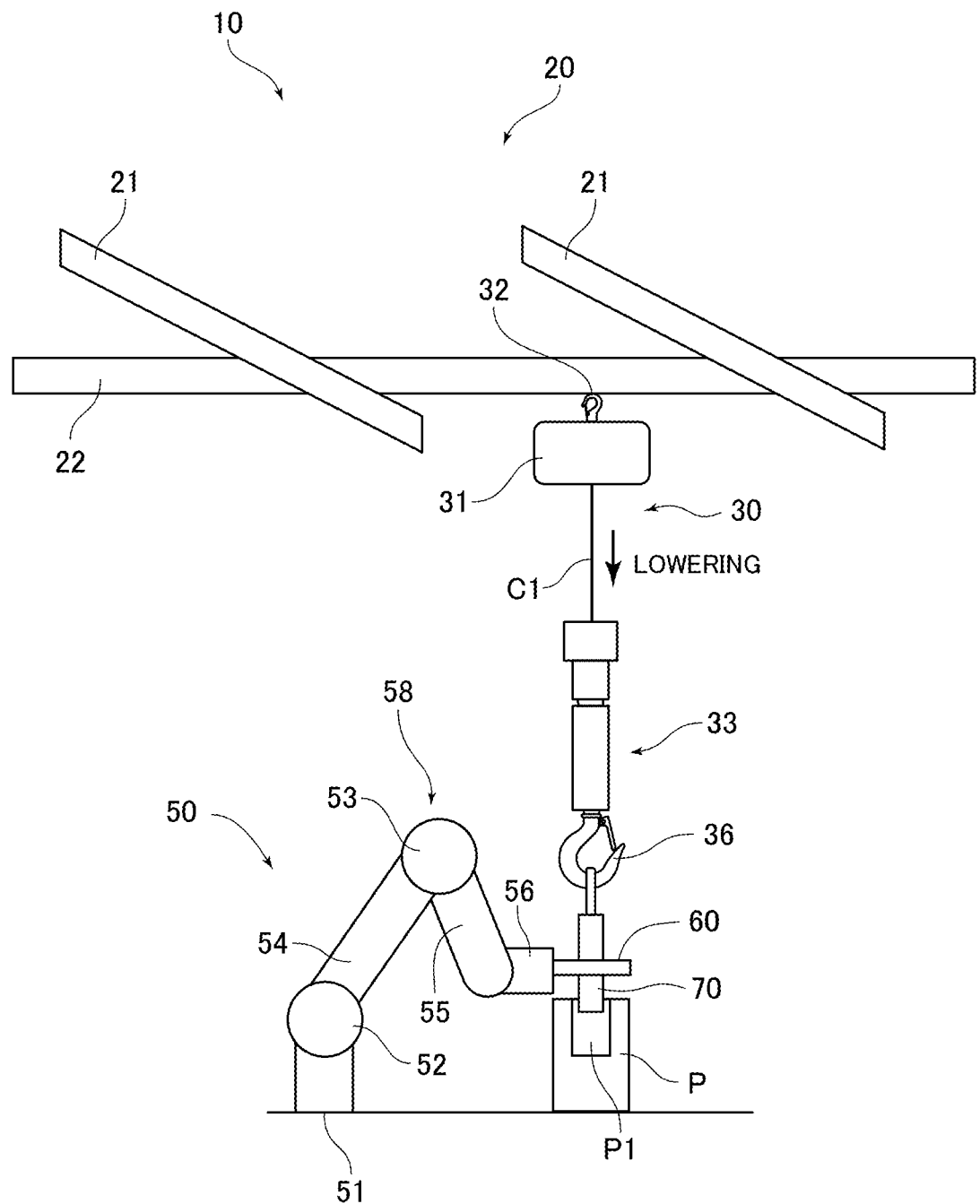
FIG. 8 is a view illustrating a state of each component of the transport system in step S2 illustrated in FIG. 6.

FIG. 8 is a view illustrating a state of each component of the transport system 10 in step S2. As illustrated in FIG. 8, after step S1, the main control part 81 outputs a predetermined command to the hand control part 83 upon receiving a signal from the robot control part 84 that the robot hand 60 has completed moving, and based on the predetermined command, the robot hand 60 releases the state of holding the hand holding part 72 of the chucking device 70 based on the control of the hand control part 83. The main control unit 81 receives a release completion signal from the hand control part 83 and commands the hoisting machine 30 to stop the torque control (balancer control) and switch to height control. The hoisting machine 30 receives a lowering command to a target height below the current position from the main control part 81 and performs the lowering operation. That is, in the hoisting machine control part 45, a control mode is switched from a torque control (balancer control) mode to a height control mode based on the control command from the main control part 81. Then, the hoisting machine control part 45 controls the drive of the drive motor 40 to perform the lowering operation to lower the chucking device 70 to a predetermined target height (chucking height) at which the chucking operation of the package P can be started (corresponding to part of a height control step). The term "landing" means that the package is shifted from a suspended state to a landing state (a state placed on the placement surface), and "landing height" means the height at the moment when the package is placed from the suspended state to the placement surface (approximately the same height as the "dynamic-lift-off height" described below).

[Chucking Device 70 in Step S2]

Also in step S2 at the insertion time of the chucking device 70, the expansion holding part 74b of the chucking device 70 remains in the non-expansion state, as in step S1 above.

[Robot Hand 60 in Step S2]

In step S2, the hand control part 83 controls the actuation of the actuator 64 of the robot hand 60 so that the chucking device 70 continues to be released based on the control command from the main control part 81 (corresponding to part of a release control step).

[Robot Device 50 in Step S2]

In step S2, the robot device 50 is stopped based on the control command from the robot control part 84. That is, the robot control part 84 stops the actuation of each of the motors 57a to 57f. Thereby, the robot hand 60 stops, and the chucking device 70 is lowered relative to the robot hand 60 as the lowering operation of the hoisting machine 30.

Step S3: Stop at Chucking Height

[Hoisting Machine 30 in Step S3]

Figure 9:
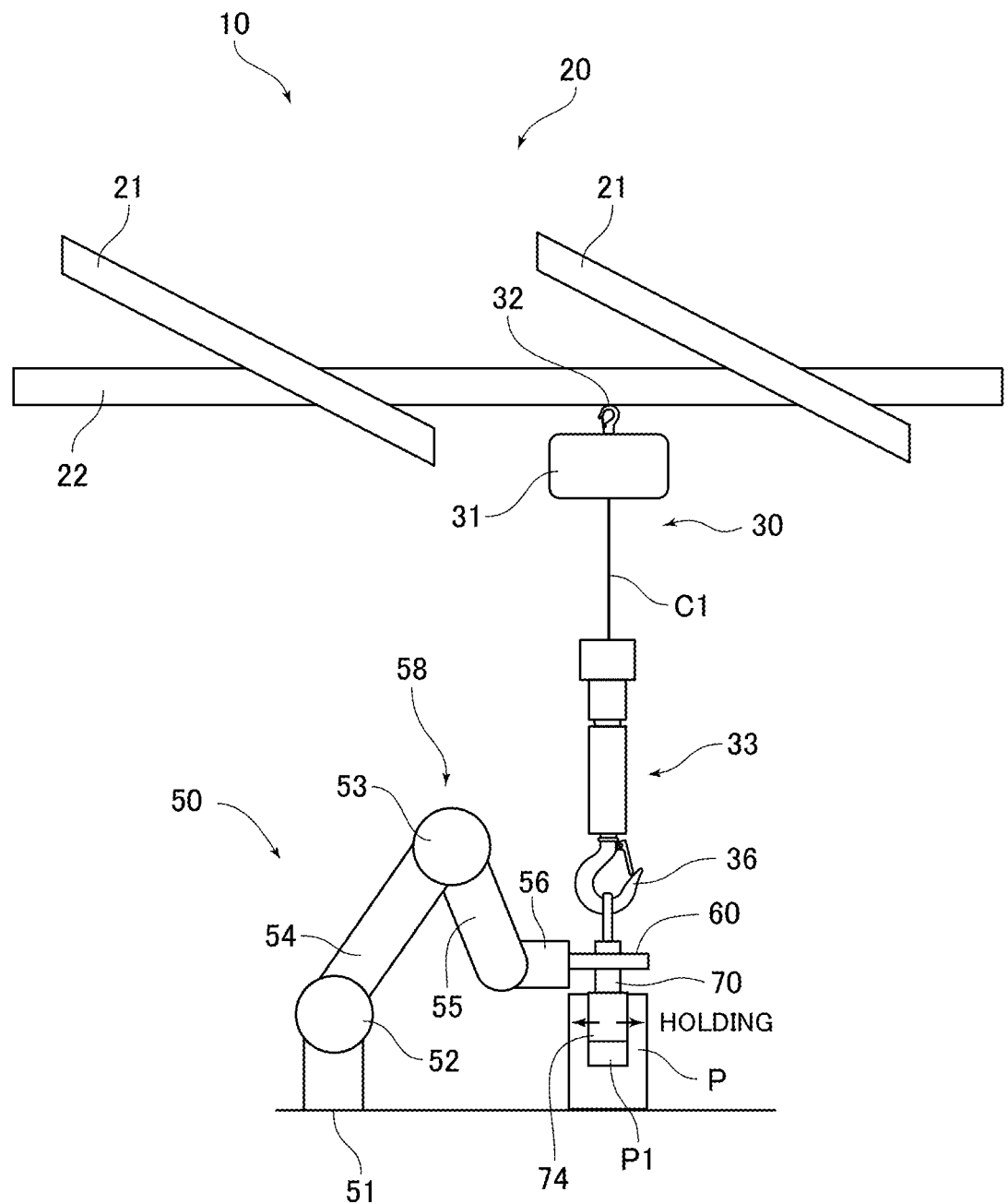
FIG. 9 is a view illustrating a state of each component of the transport system in step S3 illustrated in FIG. 6.

FIG. 9 is a view illustrating a state of each component of the transport system 10 in step S3. As illustrated in FIG. 9, when reaching the chucking height, which is the predetermined target height in the height control, that is, when the insertion of the expansion holding part 74 into the insertion hole P1 of the package P is completed so that the chucking device 70 can start the chucking operation to hold the package P, the hoisting machine control part 45 stops the drive of the drive motor 40 (corresponding to part of the height control step).

[Chucking Device 70 in Step S3]

Based on the control command from the main control part 81, the chucking control part 82 controls the actuation of the air drive part 73 to pressurize the expansion holding part 74b with the air drive part 73 at the timing when the drive motor 40 is stopped or at a later timing. That is, in step S2, the chucking device 70 is in a state to hold the package P.

[Robot Hand 60 in Step S3]

Also in step S3, the robot hand 60 continues to release the chucking device 70 as in step S2 (corresponding to part of the release control step).

[Robot Device 50 in Step S3]

Also in step S3, the actuation of each of the motors 57a to 57f of the robot device 50 is continued to be stopped as in step S2. That is, the robot device 50 continues to be stopped.

Step S4: Hoisting for Dynamic Lift-Off

[Hoisting Machine 30 in Step S4]

Figure 10:
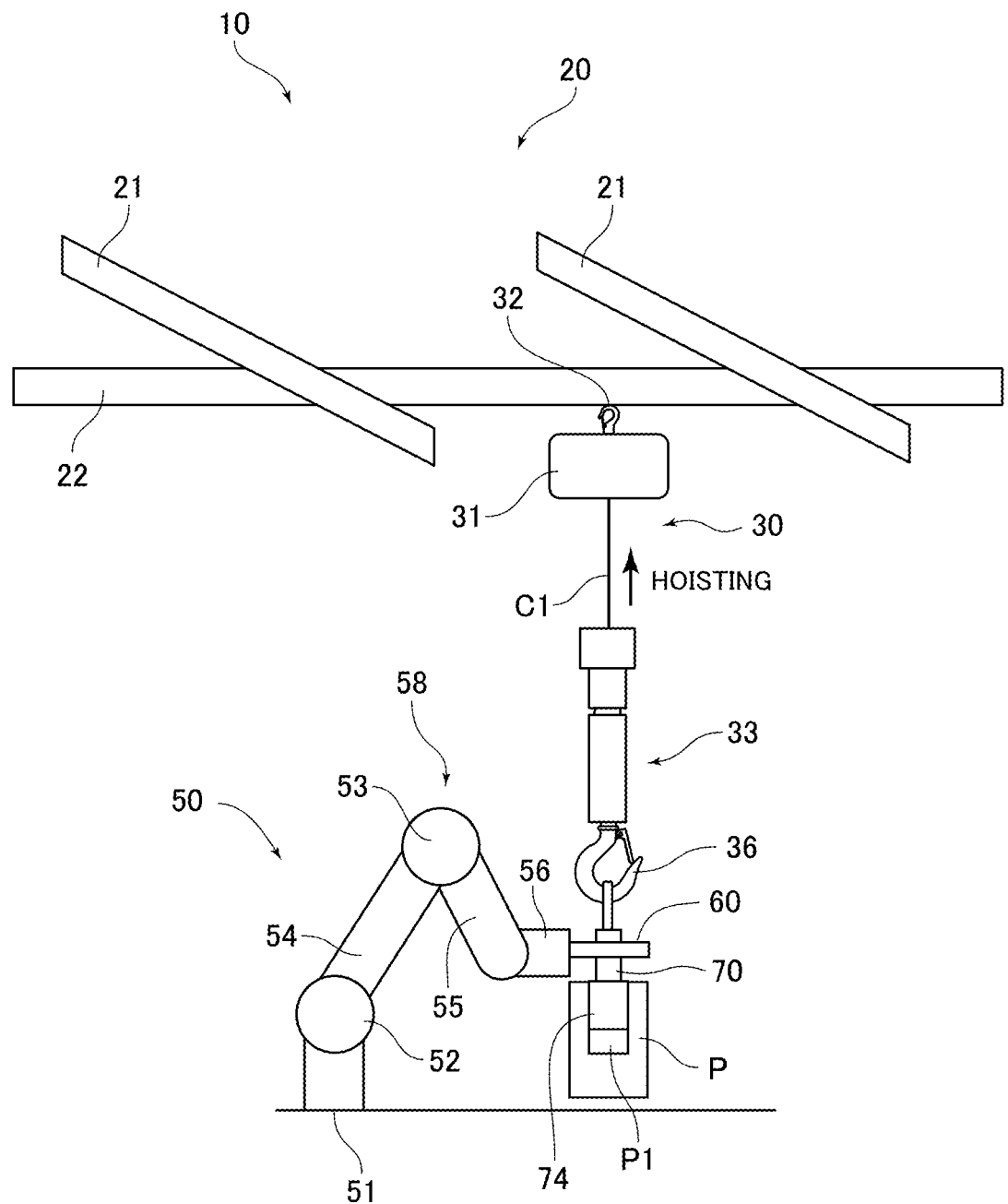
FIG. 10 is a view illustrating a state of each component of the transport system in step S4 illustrated in FIG. 6.

FIG. 10 is a view illustrating a state of each component of the transport system 10 in step S4. As illustrated in FIG. 10, the hoisting machine 30 performs a hoisting operation. That is, the hoisting machine control part 45 controls the drive of the drive motor 40 to perform the hoisting operation such that the chucking device 70 is raised to a predetermined target height (corresponding to part of the height control step) based on the control command from the main control part 81. With this hoisting operation, the package P is lifted higher than the dynamic-lift-off height, and the load sensor 44 detects the load when the package P is suspended, and the load is stored in the memory 45a. The term "dynamic lift-off" means that the package is shifted from the state placed on the placement surface to the suspended state, and "dynamic-lift-off height" means the height at the moment when the package is in the suspended state from the state placed on the placement surface. By positioning the chucking device 70 at the predetermined target height, the robot hand 60 waits ready to hold a portion of the hand holding part 72 of the chucking device 70 and with no load by the robot hand 60 acting on the load sensor 44.

[Chucking Device 70 in Step S4]

Also in step S4, the chucking device 70 continues to hold the package P as in step S3 above. Therefore, the package P rises with the hoisting operation of the hoisting machine 30.

[Robot Hand 60 in Step S4]

Also in step S4, the robot hand 60 continues to release the chucking device 70 as in steps S2 and S3 (corresponding to part of the release control step). Therefore, the chucking device 70 rises relative to the robot hand 60 as the hoisting operation of the hoisting machine 30.

[Robot Device 50 in Step S4]

Also in step S4, the actuation of each of the motors 57a to 57f of the robot device 50 is continued to be stopped as in steps S2 and S3. That is, the robot device 50 continues to be stopped.

Step S5: Transport of Package

[Hoisting Machine 30 in Step S5]

Figure 11:
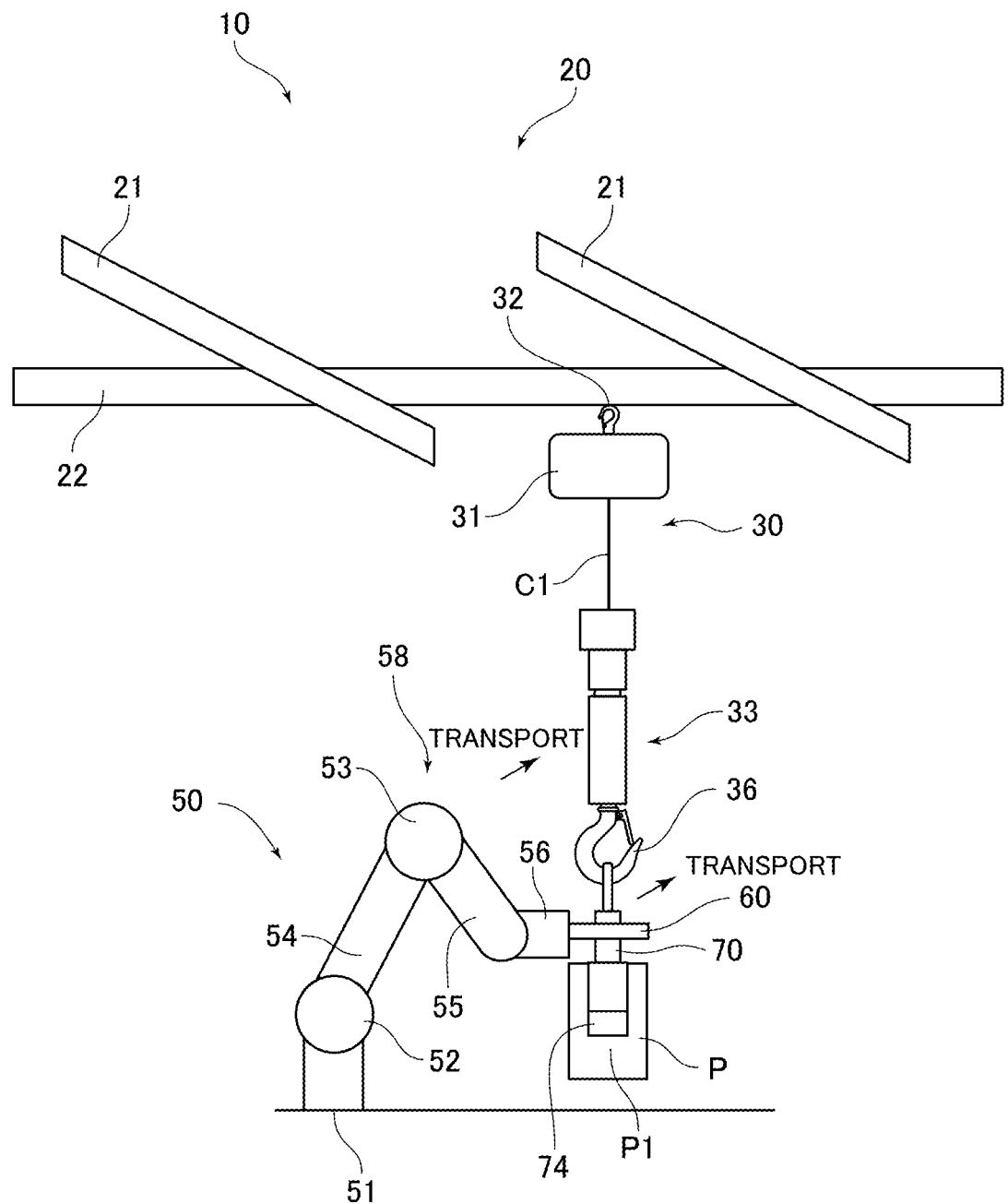
FIG. 11 is a view illustrating a state of each component of the transport system in step S5 illustrated in FIG. 6.

FIG. 11 is a view illustrating a state of each component of the transport system 10 in step S5. As illustrated in FIG. 11, in step S5, the torque control (balancer control) is performed as in step S1 (corresponding to part of the torque control step). In this torque control (balancer control), it is controlled such that a constant torque is exerted on the drive motor 40 based on the load value stored in the memory 45a. Therefore, during the execution of the position control in which the robot device 50 moves the robot hand 60 along a predetermined path, the load detected by the load sensor 44 becomes lighter (smaller) when the robot hand 60 is moved in a direction to raise the package P, so the hoisting machine control part 45 applies the driving force in the hoisting direction to the drive motor 40 according to the changed amount. When the robot device 50 moves the robot hand 60 in a direction to lower the package P, the load detected by the load sensor 44 becomes larger, so the hoisting machine control part 45 applies the driving force in the lowering direction to the drive motor 40 according to the changed amount. These allow the robot hand 60 to be moved to the target position (including the target height) along the predetermined path by controlling the robot arm 58 of the robot device 50 described below without the load of the package P acting directly on the robot device 50, and the package P is transported accordingly.

[Chucking Device 70 in Step S5]

Also in step S5, the chucking device 70 continues to hold the package P as in steps S3 and S4 above. Therefore, the package P moves with the actuation of the robot device 50 as described below.

[Robot Hand 60 in Step S5]

In step S5, the hand control part 83 controls the actuation of the actuator 64 of the robot hand 60 to grip the chucking device 70 based on the control command from the main control part 81 (corresponding to part of the holding control step). Thereby, the robot hand 60 is in a state to hold the hand holding part 72 of the chucking device 70. As described above, the chucking device 70 holds the package P. Accordingly, the package P is transported with the actuation of the robot device 50 as described below.

[Robot Device 50 in Step S5]

In step S5, the robot control part 84 controls the actuation of the robot arm 58 (position control) based on the control command from the main control part 81. That is, the robot control part 84 controls the actuation of each of the motors 57a to 57f so that the robot hand 60 (chucking device 70) reaches the target position (including the target height). In such position control, the actuation of each of the motors 57a to 57f is controlled so that the package P moves to the target position.

Step S6: Lowering for Landing

[Hoisting Machine 30 in Step S6]

Figure 12:
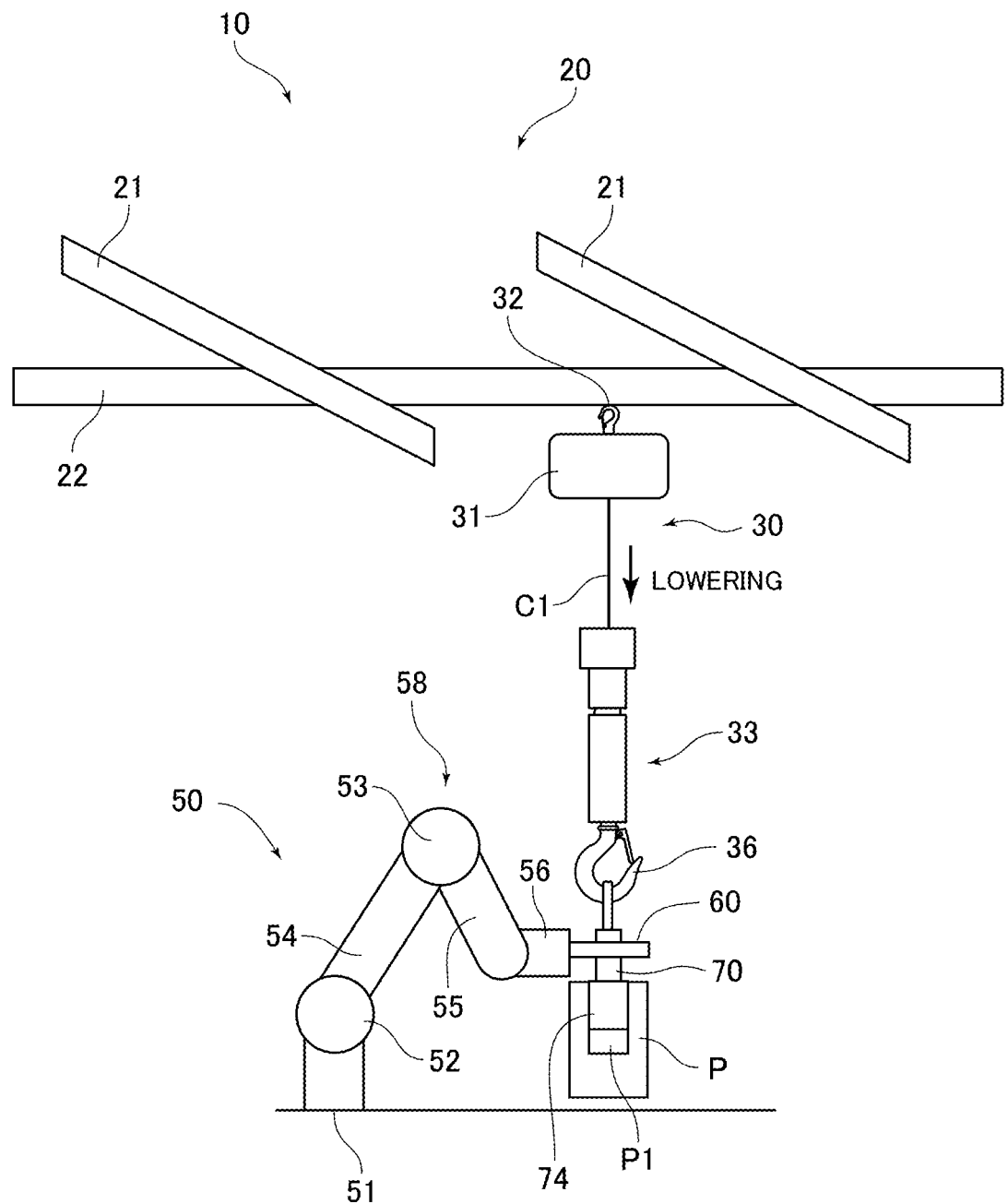
FIG. 12 is a view illustrating a state of each component of the transport system in step S6 illustrated in FIG. 6.

FIG. 12 is a view illustrating a state of each component of the transport system 10 in step S6. When it is detected that the robot hand 60 has reached the target position in step S5, operation of step S6 similar to step S2 is executed. That is, in step S6, the hoisting machine 30 performs the lowering operation as illustrated in FIG. 6. At this time, the main control part 81 receives the release completion signal of the robot hand 60 from the hand control part 83 and transmits a command to the hoisting machine control part 45 to switch the control mode from the torque control (balancer control) mode to the height control mode. The hoisting machine control part 45 switches to the height control mode and waits until the target height command is received from the main control part 81. Then, the main control part 81 commands the hoisting machine control part 45 to lower to the target height of the lower hook 36 for landing the package P (the height set in advance according to the height of the placement surface). The hoisting machine control part 45 controls the drive of the drive motor 40 to perform such lowering operation for landing the package P on the placement surface (corresponding to part of the height control step).

[Chucking Device 70 in Step S6]

Also in step S6, the chucking device 70 continues to hold the package P in the same manner as in steps S3 to S5 above. Therefore, the package P is lowered along with the lowering operation as described above.

[Robot Hand 60 in Step S6]

In step S6, the robot hand 60 performs the same operation as in step S2 described above. That is, in the robot hand 60, the hand control part 83 controls the actuation of the actuator 64 to release the chucking device 70 based on the control command from the main control part 81 (corresponding to part of the release control step).

[Robot Device 50 in Step S6]

In step S6, the robot device 50 is stopped based on the control command from the robot control part 84 as in step S2 above. That is, the robot control part 84 stops the actuation of each of the motors 57a to 57f. Thereby, the robot hand 60 is stopped, and the chucking device 70 is lowered relative to the robot hand 60 along with the lowering operation of the hoisting machine 30.

Step S7: Stop at Landing

[Hoisting Machine 30 in Step S7]

Figure 13:
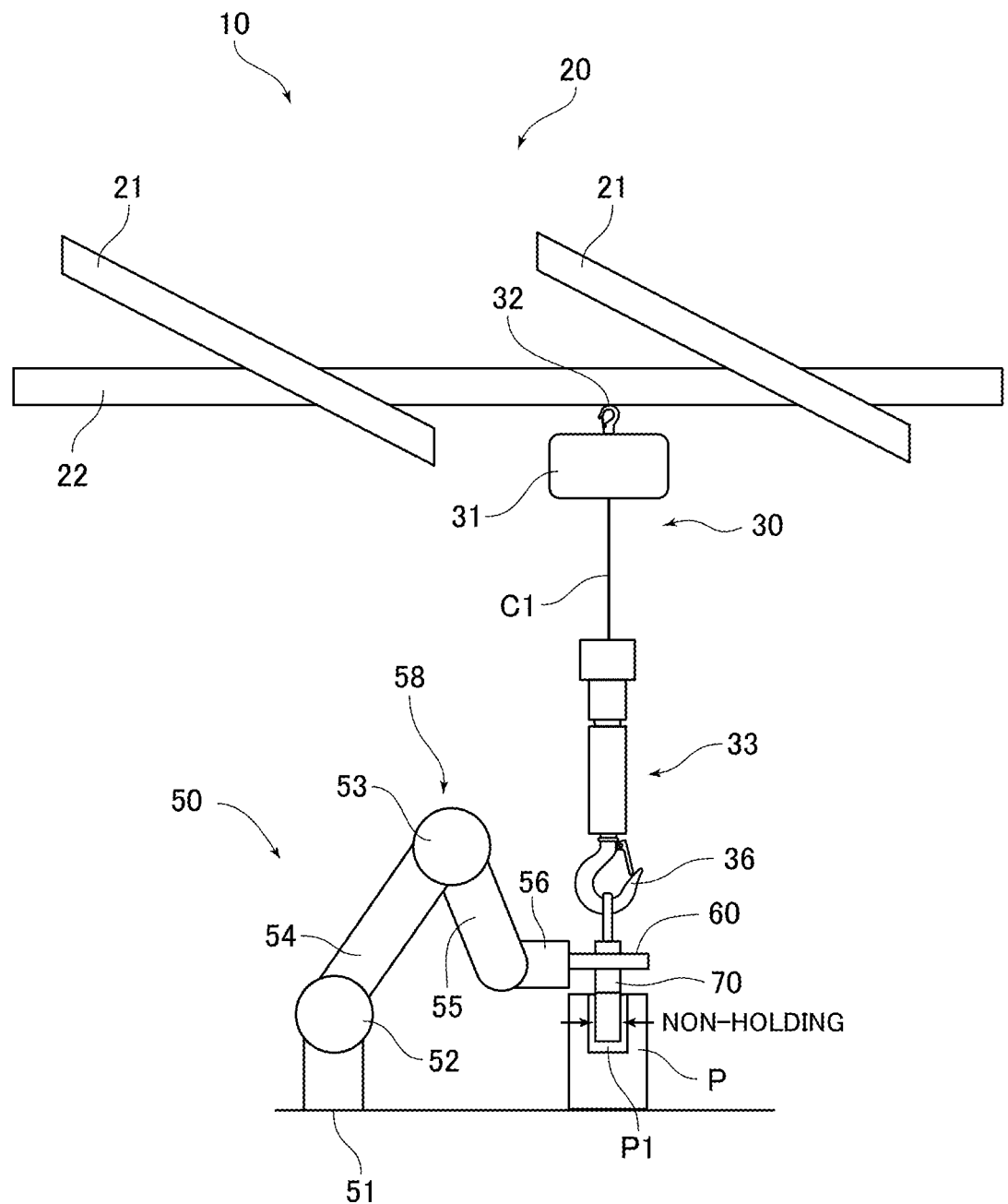
FIG. 13 is a view illustrating a state of each component of the transport system in step S7 illustrated in FIG. 6.

FIG. 13 is a view illustrating a state of each component of the transport system 10 in step S7. As illustrated in FIG. 13, when the lower hook 36 reaches the predetermined target height set in advance in the height control described above, the hoisting machine control part 45 stops the drive of the drive motor 40 (corresponding to part of the height control step). At this time, the landing may be detected by the detection information of the load sensor 44 provided in the hoisting machine 30, and the hoisting machine control part 45 may notify the main control part 81 of the landing. This completes the transport of the package P.

[Chucking Device 70 in Step S7]

At the timing when the drive motor 40 stops, or at a later timing, the chucking control part 82 controls the actuation of the air drive part 73 to release a state in which the air drive part 73 pressurizes the expansion holding part 74b in the chucking device 70 based on the control command from the main control part 81 that determined the landing. That is, in step S7, the chucking device 70 is switched from the state holding the package P to a non-holding state.

[Robot Hand 60 in Step S7]

Also in step S3, the robot hand 60 continues to release the chucking device 70 as in step S6 above (corresponding to part of the release control step).

[Robot Device 50 in Step S7]

Also in step S7, the actuation of each of the motors 57a to 57f of the robot device 50 is continued to be stopped as in step S6 above. That is, the robot device 50 continues to be stopped.

Step S8: Taking Out Chucking Device

[Hoisting Machine 30 in Step S8].

Figure 14:
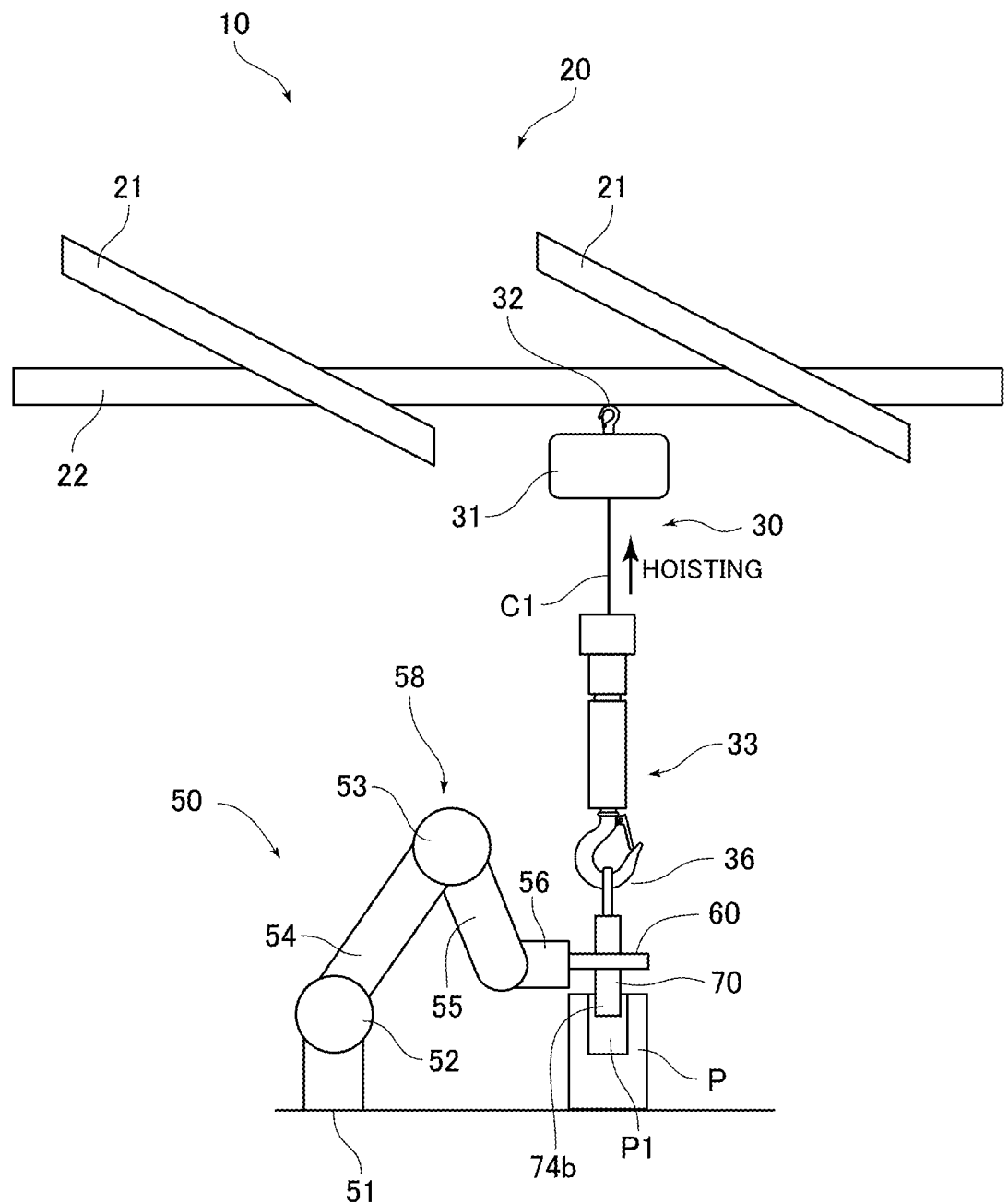
FIG. 14 is a view illustrating a state of each component of the transport system in step S8 illustrated in FIG. 6.

FIG. 14 is a view illustrating a state of each component of the transport system 10 in step S8. In step S8, as a preparatory step to start taking out the chucking device 70 from the package P, the same hoisting operation as in step S4 is performed to bring the predetermined portion of the hand holding part 72 to a height where it can be held by the robot hand 60 as illustrated in FIG. 14. That is, the hoisting machine control part 45 controls the drive of the drive motor 40 to perform the hoisting operation to raise the chucking device 70 to a predetermined target height (corresponding to part of the height control step) based on the control command from the main control part 81. In this hoisting operation, the package P is not lifted, but only the chucking device 70 is lifted by the lower hook 36, different from step S4. Therefore, the load detected by the load sensor 44 is a very small value compared to the state when the package P is suspended, and the hoisting machine control part 45 stores such load value in the memory 45a and waits ready to switch the control mode to the torque control (balancer control) mode.

[Chucking Device 70 in Step S8]

Also in step S8, the chucking device 70 continues to be the non-holding state of the package P as in step S7 above. Therefore, the chucking device 70 rises against the package P as the hoisting operation of the hoisting machine 30.

[Robot Hand 60 in Step S8]

Also in step S8, the robot hand 60 continues to release the chucking device 70 (corresponding to part of the release control step) as in steps S6 and S7. Therefore, the chucking device 70 rises relative to the robot hand 60 along with the hoisting operation of the hoisting machine 30.

[Robot Device 50 in Step S8]

Also in step S8, the actuation of each of the motors 57a to 57f of the robot device 50 continues to be stopped as in steps S6 and S7. That is, the robot device 50 continues to be stopped.

Step S9: Moving of Chucking Device 70

[Hoisting Machine 30 in Step S9]

Figure 15:
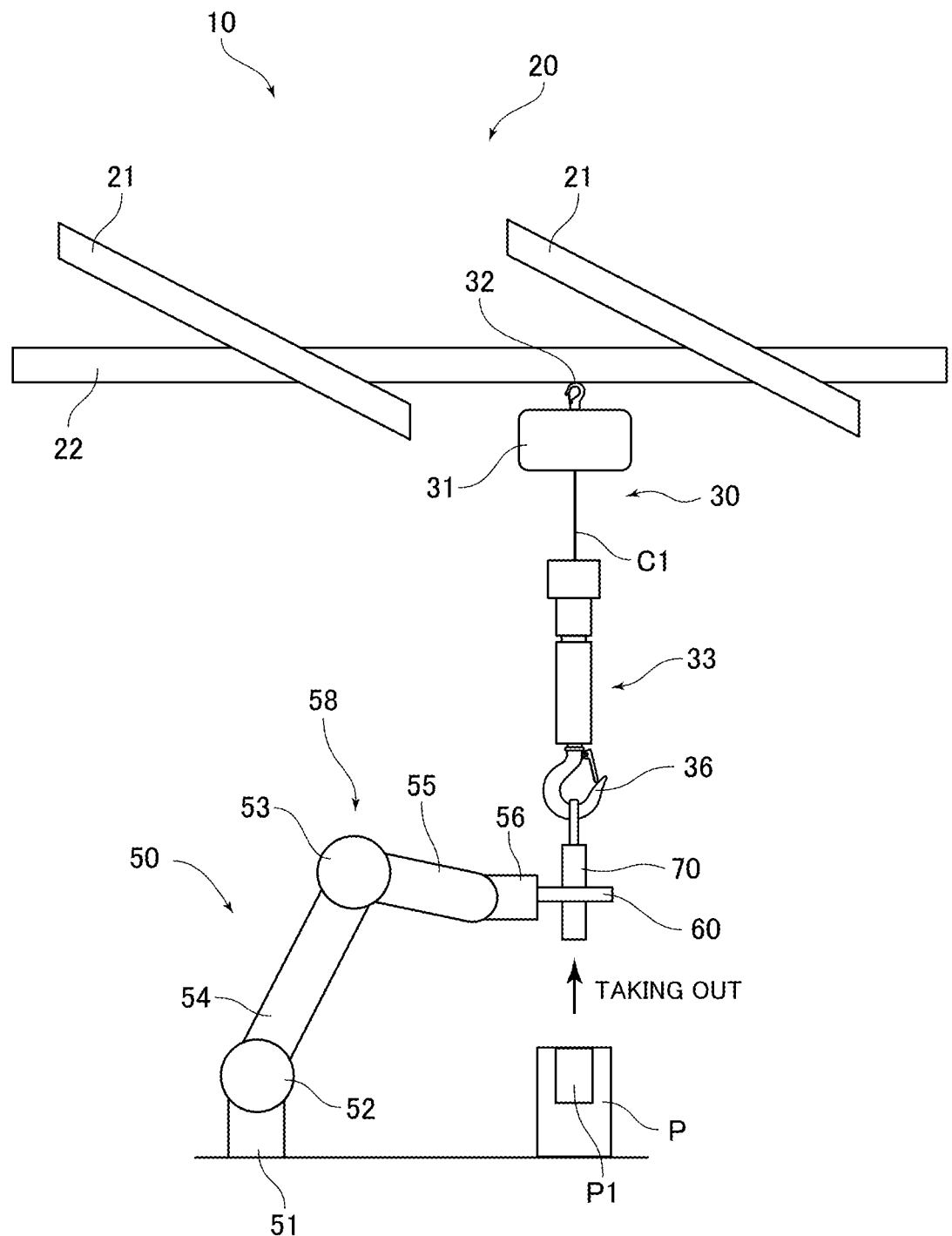
FIG. 15 is a view illustrating a state of each component of the transport system in step S9 illustrated in FIG. 6.

FIG. 15 is a view illustrating a state of each component of the transport system 10 in step S9. In step S9, the torque control (balancer control) is performed by switching from the height control as in steps S1 and S5 as illustrated in FIG. 15. In this torque control (balancer control), it is controlled such that a constant torque is exerted on the drive motor 40 based on the load value stored in the memory 45a (load value when the package P is not suspended). Therefore, when the robot device 50 moves the chucking device 70 up and down, the hoisting machine control part 45 controls the drive of the drive motor 40 so that the load acting on the robot device 50 is reduced (corresponding to part of the torque control step).

[Chucking Device 70 in Step S9]

Also in step S9, the chucking device 70 continues to be the non-holding state of the package P as in steps S7 and S8 above.

[Robot Hand 60 in Step S9]

In step S9, the hand control part 83 controls the actuation of the actuator 64 of the robot hand 60 to grip the chucking device 70 based on the control command from the main control part 81 that verifies the switching to the torque control (balancer control) mode. Thereby, the robot hand 60 is in a state to hold the hand holding part 72 of the chucking device 70 (corresponding to part of the holding control step). Therefore, the chucking device 70 moves along with the actuation of the robot device 50 as described below.

[Robot Device 50 in Step S9]

In step S9, the robot control part 84 controls the actuation of the robot arm 58 (position control) based on the control command from the main control part 81. That is, the robot control part 84 controls the actuation of each of the motors 57a to 57f so that the robot hand 60 (chucking device 70) reaches the target position. One example of such position control includes one to move the chucking device 70 along a predetermined path to a position for lifting the next package P.

Each of the above steps S1 to S9 can be executed by the transport system 10 to automatically complete a series of transport processes for the package P.

3. Regarding Effects

According to the transport system 10 configured as described above, the hoisting machine 30 that can lift and lower the package P and includes the load sensor 44 (load detection means) that detects the acting load; a hand crane 20 (crane) to which the hoisting machine 30 is attached and capable of horizontally moving the hoisting machine 30 by applying external force to the hoisting machine 30; the chucking device 70 (suspension means) that hangs from the hoisting machine 30 and can hold the package P; and the robot device 50 that includes the robot hand 60 (holding means) capable of holding the package P or the chucking device 70 (suspension means) and the robot arm 58 capable of moving the robot hand 60 (holding means) to a desired position; the hoisting machine control part 45 (first control means) capable of performing torque control to generate torque in accordance with the load acting on the hoisting machine 30 and height control to move the chucking device 70 (suspension means) to a predetermined target height; a robot control part 84 (second control means) that controls actuation of the robot arm 58, a hand control part 83 (third control means) that controls actuation of the robot hand 60, and a main control part 81 (main control means) that gives predetermined control commands to the hoisting machine control part 45 (first control means), the robot control part 84 (second control means), and the hand control part 83 (third control means) are included.

When moving the chucking device 70 (suspension means) other than at the dynamic-lift-off time when the package P is lifted from the placement surface or other than at the landing time when the package P is placed on the placement surface, that is, when transporting the package P other than at the height control time, when moving the chucking device 70 toward the package P before the height control, or when moving the chucking device 70 from the package P after the height control, the hand control part 83 (third control means) executes the holding control so that the holding by the robot hand 60 (holding means) is performed according to the control command from the main control part 81 (main control means). Along with such control, the hoisting machine control part 45 (first control means) executes the torque control in which the chucking device 70 (suspension means) is lowered when the load increases and hoisted when the load decreases based on detection results of changes in the acting load by the load sensor 44 (load detection means) according to the control command from the main control part 81 (main control means).

At the time of the dynamic lift-off when the package P is lifted from the placement surface, or at the time of the landing when the package is placed on the placement surface, the hand control part 83 (third control means) executes the release control to release the holding by the robot hand 60 (holding means) according to the control command from the main control part 81 (main control means). Along with such control, the hoisting machine control part 45 (first control means) executes the height control to actuate the hoisting machine 30 to control the robot hand 60 (holding means) to move vertically to the target height according to the control command from the main control part 81 (main control means).

In this configuration, at the time of dynamic lift-off or landing of the package P, the position control of the hoisting machine 30 allows the package P to be lifted or lowered via the chucking device 70 (suspension means). In this position control of the hoisting machine 30, the robot hand 60 releases the holding of the chucking device 70 (suspension means), so the chucking device 70 (suspension means) moves vertically relative to the robot hand 60. Therefore, it is possible to prevent synchronization deviation between the vertical movement of the chucking device 70 (suspension means) by the position control of the hoisting machine 30 and the vertical movement of the robot arm 58 of the robot device 50.

When transporting the package P other than at the time of the height control for the dynamic lift-off or landing (step S5), when moving the chucking device 70 (suspension means) toward the package P before the height control by the hoisting machine 30 (step S1), or when moving the chucking device 70 (suspension means) from the package P after the height control (step S9), the hoisting machine 30 performs the "torque control" (balancer control). Therefore, when transporting the package P, the load of the package P can be supported (borne) on the hoisting machine 30 side while the robot arm 58, when actuated, can transport the package P to a desired position by its actuation.

That is, the hoisting machine 30 does not positively move the package P in the vertical direction, although it provides a load (torque) that is balanced with the package P when the robot arm 58 is not actuated through the torque control (balancer control). Therefore, it is possible to prevent synchronization deviation in the vertical movement between the hoisting machine 30 and the robot arm 58.

In this embodiment, the robot hand 60 releases the holding of the chucking device 70 (suspension means), although the height control by the hoisting machine 30 is performed at the time of the dynamic lift-off or landing. On the other hand, other than for the dynamic lift-off or landing, when transporting the package P (step S5), when moving the chucking device 70 (suspending means) toward the package P before the height control by the hoisting machine 30 (step S1), or when moving the chucking device 70 (suspending means) away from the package P after the height control (step S9), the torque control (balancer control) by the hoisting machine 30 is performed while the robot hand 60 holds the chucking device 70 (suspension means). Since the transport system 10 performs such sequential control, there is no synchronization deviation between the hoisting machine 30 and the robot arm 58 in the vertical movement.

In this embodiment, there is no means in the robot hand 60, such as the roller ball as disclosed in Patent Literature 1, to absorb the synchronization deviation between the robot arm 60 and the hoisting machine 30. Therefore, the configuration is simplified to the extent that the roller ball is not present in the robot arm 60, and thus the manufacturing cost can be reduced compared to the configuration disclosed in Patent Literature 1. In the torque control (balancer control), the hoisting machine 30 can move the package P to the desired position by actuating the robot arm 58 in a holding state where the robot arm 60 grips the hand holding part 72 of the chucking device 70 (suspension means). Therefore, there are fewer restrictions on movement on the robot device 50 side, and the operability during transportation of the package P is also better. It is also possible to move the chucking device 70 along the predetermined path while holding it firmly with the robot hand 60 and controlling posture of the chucking device 70.

In this embodiment, the system further includes the chucking control part 82 (fourth control means) that controls the holding and release holding of the package P by the chucking device 70 (suspension means) according to the control command from the main control part 81 (main control means).

When configured in this way, the chucking device 70 (suspension means) can hold and release holding of the package P well based on the control by the chucking control part 82 (fourth control means) according to the control command from the main control part 81 (main control means). This makes it possible to change the holding of the package P.

In this embodiment, in the torque control (balancer control), the robot control part 84 (second control means) executes the position control to move the chucking device 70 (suspension means) to the predetermined target position by the actuation of the robot arm 58 including vertical direction.

Therefore, in the torque control (balancer control) by the hoisting machine 30, the package P can be transported by the actuation of the robot arm 58, and in the transport of the package P, the package P can be transported to the desired position by the actuation of the robot arm 58 while the load of the package P is supported (borne) on the hoisting machine 30 side. Further, the hoisting machine 30 does not positively (actively) hoist and lower the package P to the target height position even when the package P is moved by the actuation of the robot arm 58, thereby preventing the synchronization deviation between the hoisting machine 30 and the robot arm 58 in the vertical movement.

In this embodiment, the robot control part 84 (second control means) controls the robot arm 58 to stop its actuation in the height control by the hoisting machine 30.

Therefore, at the time of the dynamic lift-off or landing, the height control by the hoisting machine 30 enables the hoisting machine 30 to lift or lower the package P through the chucking device 70 (suspension means) relative to the robot arm 58 (robot device 50). Therefore, it is possible to prevent the synchronization deviation between the vertical movement of the chucking device 70 (suspension means) achieved through the height control by the hoisting machine 30 and the vertical movement of the robot arm 58 of the robot device 50.

In this embodiment, the suspension means is the chucking device 70 that can hold the package P. The chucking device 70 continues to hold the package P in both the height control and torque control between the stopped state of the hoisting machine 30 before the dynamic lift-off of the package P and the stopped state of the hoisting machine 30 after the landing of the package P.

Therefore, the package P is held between the stopped state of the hoisting machine 30 before the dynamic lift-off of the package P and the stopped state of the hoisting machine 30 after the landing of the package P, thereby the package P can be securely held by the chucking device 70 immediately before and after, and during the transport of the load because the package P.

MODIFICATION EXAMPLE

Although embodiments of the present invention have been explained above, the present invention can be variously modified in addition to the above. The modifications will be explained below.

In the above embodiments, the chucking device 70 is described as the suspension means. However, the suspension means is not limited to the chucking device 70. For example, the suspension means may be configured to hold the package P by an electromagnet when the package P can be attracted and held by magnetic force or may be configured by a support member that can be opened and closed.

The robot control part 84 corresponding to the second control means and the hand control part 83 corresponding to the third control means may be one control part.

In the above embodiments, the robot hand 60 as illustrated in FIG. 3 is described as the holding means. However, the holding means is not limited to the robot hand 60 as illustrated in FIG. 3. For example, the robot hand 60 corresponding to the holding means is not limited to the configuration described above. For example, the robot hand may be configured with a plurality of fingers or claws and clamp the chucking device 70, or other devices with those plurality of fingers or claws. In addition to the robot hand, the holding means may also be an end effector that holds the chucking device 70 by vacuum absorption or magnetic attachment.

In the above embodiments, the chucking device 70 is described as the suspension means. However, the suspension means is not limited to the chucking device 70. For example, a lifting magnet that can absorb a workpiece, or the like by magnetic force may be used as the suspension means, a hook member that can automatically sling or release a sling to an eye part provided on a package may be used as the suspension means, or the lower hook 36 of the hoisting machine 30 may be used as the suspension means.

In the above embodiments, the hand crane 20 is described as the crane. However, the crane is not limited to the hand crane 20. For example, the crane may be equipped with an electric trolley that allows the hoisting machine 30 or other machines, which are the objects to be suspended, to move along the traveling rail 21 and the traversing rail 22 by motor drive.

In the above embodiments, the target height may be set in operations other than the dynamic lift-off and landing.

The invention claimed is:

1. A transport system transporting a package to a desired position, comprising:
   a hoisting machine configured to lift and lower the package and includes a load detector to detect the acting load or a change in the load;
   a crane to which the hoisting machine is attached and configured to move the hoisting machine in a horizontal direction by applying external force to the hoisting machine;
   a suspender that hangs from the hoisting machine and configured to hold the package;
   a robot that includes a holder to hold the package or the suspender and a robot arm that moves the holder to a desired position;
   a first controller to perform torque control of the hoisting machine to generate torque in accordance with the load acting on the hoisting machine and height control of the hoisting machine to move the suspender to a predetermined target height;
   a second controller to control actuation of the robot arm;
   a third controller to control actuation of the holder; and
   a main controller to provide predetermined control commands to the first controller, second controller, and third controller, wherein
   when transporting the suspender other than at the time of dynamic lift-off when the package is lifted from a placement surface or other than at the time of landing when the package is placed on the placement surface, the third controller executes holding control to perform holding by the holder according to the control command from the main controller,
   the first controller executes the torque control to lower the suspender under a first condition where the load increases and to hoist the suspender under a second condition where the load decreases based on a detection result of the load detector according to the control command from the main controller, at the time of dynamic lift-off when the package is lifted from the placement surface, or at the time of landing when the package is placed on the placement surface, the third controller executes release control to release the holding by the holder according to the control command from the main controller, and the first controller executes the height control in which the hoisting machine is actuated to control moving the holder to the target height according to the control command from the main controller.

2. The transport system according to claim 1, further comprising:

a fourth controller to control the holding and release holding of the package by the suspender according to the control command from the main controller.

3. The transport system according to claim 2, wherein in the torque control, the second controller executes position control to move the holder to a predetermined target position by actuation of the robot arm including vertical direction.

4. The transport system according to claim 2, wherein in the height control, the second controller performs control to stop the actuation of the robot arm.

5. The transport system according to claim 2, wherein the suspender is a chucking device configured to hold the package, and the chucking device continues to hold the package in both the height control and torque control between a stop state of the hoisting machine before the dynamic lift-off of the package and the stop state of the hoisting machine after the package is landed.

6. The transport system according to claim 1, wherein in the torque control, the second controller executes position control to move the holder to a predetermined target position by actuation of the robot arm including vertical direction.

7. The transport system according to claim 6, wherein in the height control, the second controller performs control to stop the actuation of the robot arm.

8. The transport system according to claim 6, wherein the suspender is a chucking device configured to hold the package, and the chucking device continues to hold the package in both the height control and torque control between a stop state of the hoisting machine before the dynamic lift-off of the package and the stop state of the hoisting machine after the package is landed.

9. The transport system according to claim 1, wherein in the height control, the second controller performs control to stop the actuation of the robot arm.

10. The transport system according to claim 1, wherein the suspender is a chucking device capable of holding the package, and the chucking device continues to hold the package in both the height control and torque control between a stop state of the hoisting machine before the dynamic lift-off of the package and the stop state of the hoisting machine after the package is landed.

11. A method for controlling a transport system transporting a package to a desired position, wherein the transport system includes:

a hoisting machine configured to lift and lower the package and includes a load detector to detect the acting load or a change in the load;

a crane to which the hoisting machine is attached and that is configured to move the hoisting machine in a horizontal direction by applying external force to the hoisting machine;

a suspender that hangs from the hoisting machine and that is configured to hold the package;

a robot device that includes a holder to hold the package or the suspender and a robot arm that moves the holder to a desired position;

a first controller to perform torque control of the hoisting machine to generate torque in accordance with the load acting on the hoisting machine and height control of the hoisting machine to move the suspender to a predetermined target height;

a second controller to control actuation of the robot arm;

a third controller to control actuation of the holder; and a main controller to provide predetermined control commands to the first controller, second controller, and third controller, the method comprising:

a holding control step in which the third controller executes holding control to perform the holding by the holder according to the control command from the main controller when transporting the suspender other than at the time of dynamic lift-off when the package is lifted from a placement surface or other than at the time of landing when the package is placed on the placement surface;

a torque control step in which the first controller executes the torque control to lower the suspender under a first condition where the load increases and hoist under a second condition where the load decreases based on a detection result of the load detector according to the control command from the main controller, in the holding control step;

a release control step in which the third controller executes release control to release the holding by the holder according to the control command from the main controller at the time of dynamic lift-off when the package is lifted from the placement surface or at the time of landing when the package is placed on the placement surface, and a height control step in which the first controller executes the height control to actuate the hoisting machine to control the moving of the holder to the target height in the vertical direction according to the control command from the main controller, in the release control step.

\* \* \* \* \*